Aug. 30, 1932.  M. M. GOLDBERG  1,874,097
COMPUTING MACHINE
Original Filed June 14, 1926  17 Sheets-Sheet 2
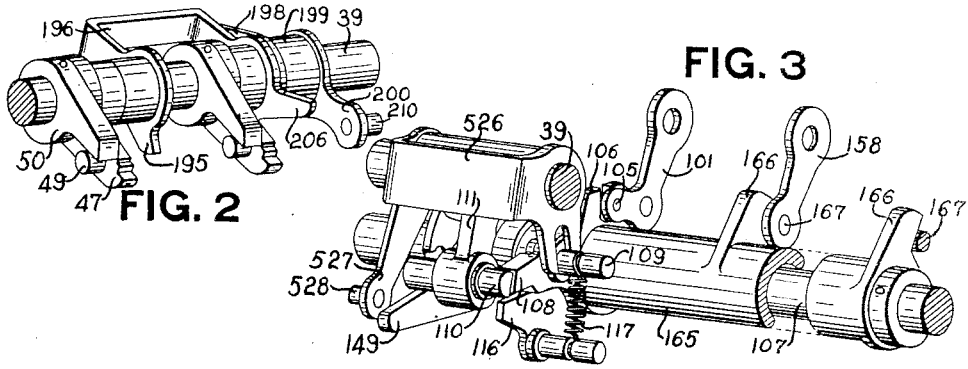
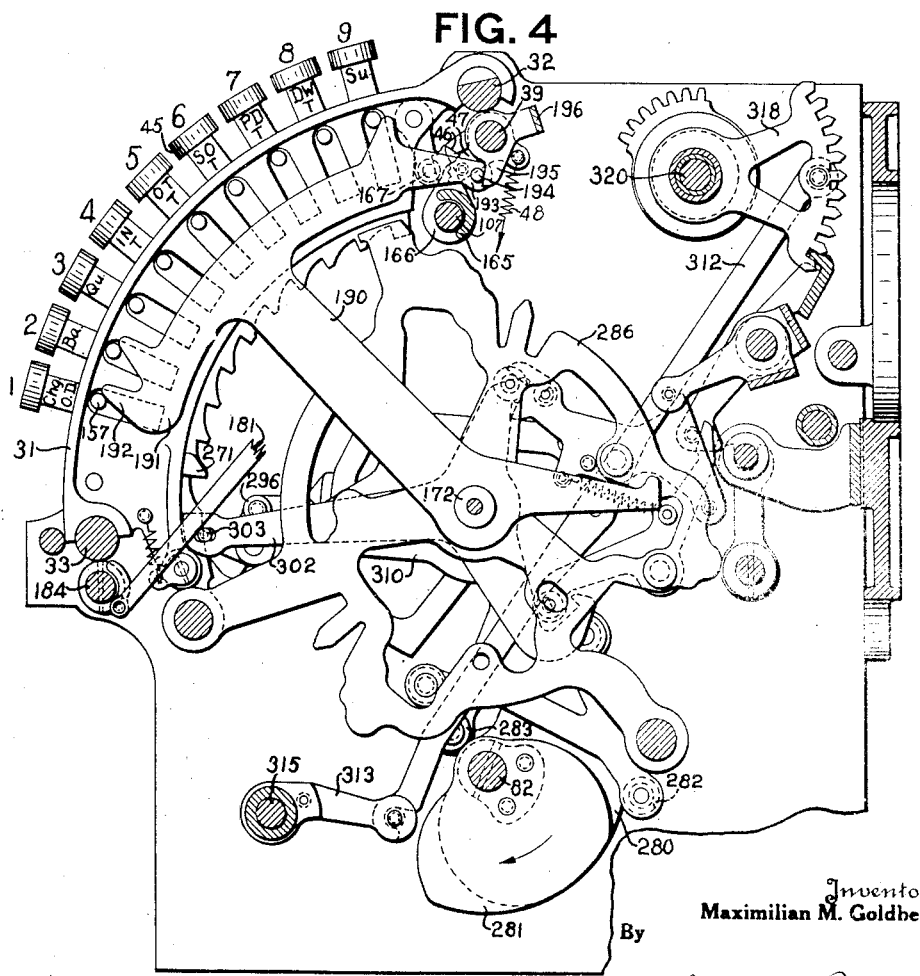
Inventor
Maximilian M. Goldberg
By
Earl Benst
His Attorney Aug. 30, 1932. M. M. GOLDBERG 1,874,097
COMPUTING MACHINE
Original Filed June 14, 1926 17 Sheets-Sheet 3

Inventor
Maximilian M. Goldberg
By
Yearl Beust
His Attorney

Aug. 30, 1932.　　　M. M. GOLDBERG　　　1,874,097
COMPUTING MACHINE
Original Filed June 14, 1926　　17 Sheets-Sheet 4
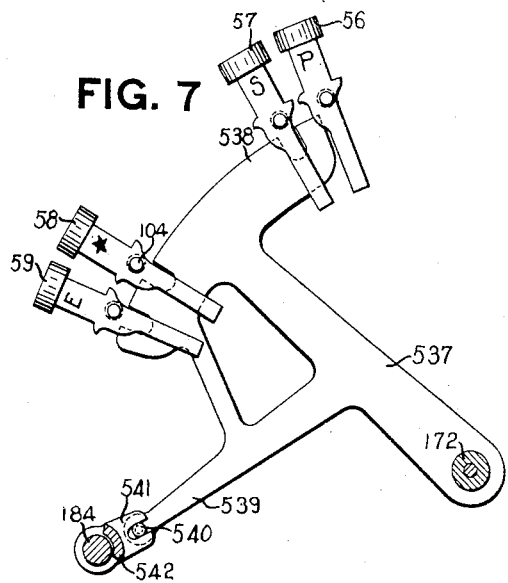
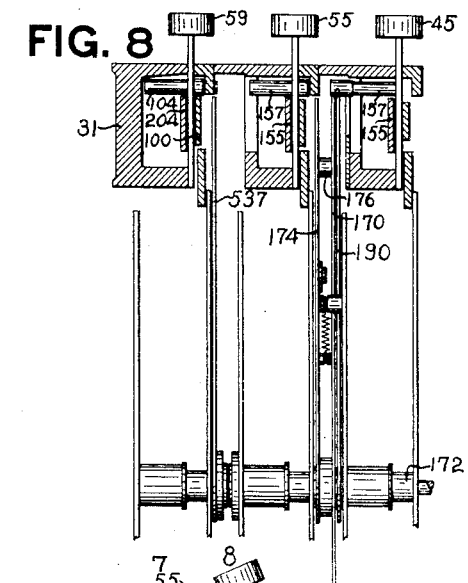
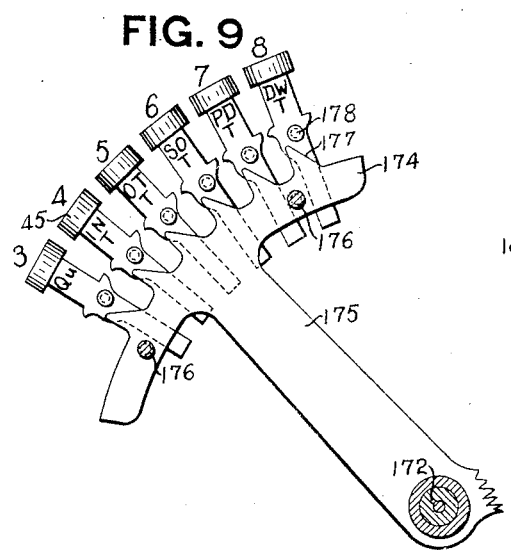
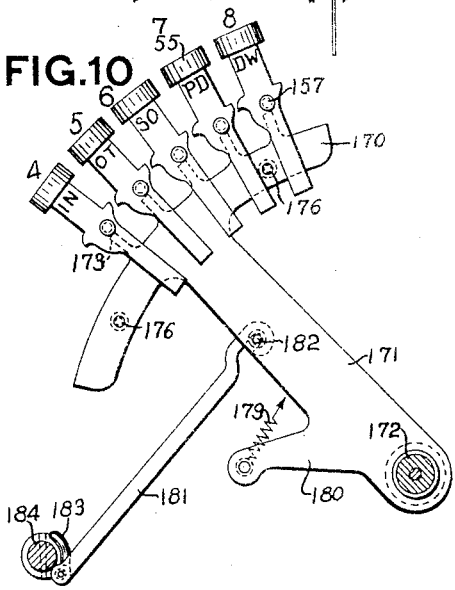
Inventor
Maximilian M. Goldberg
By Karl Benst
His Attorney

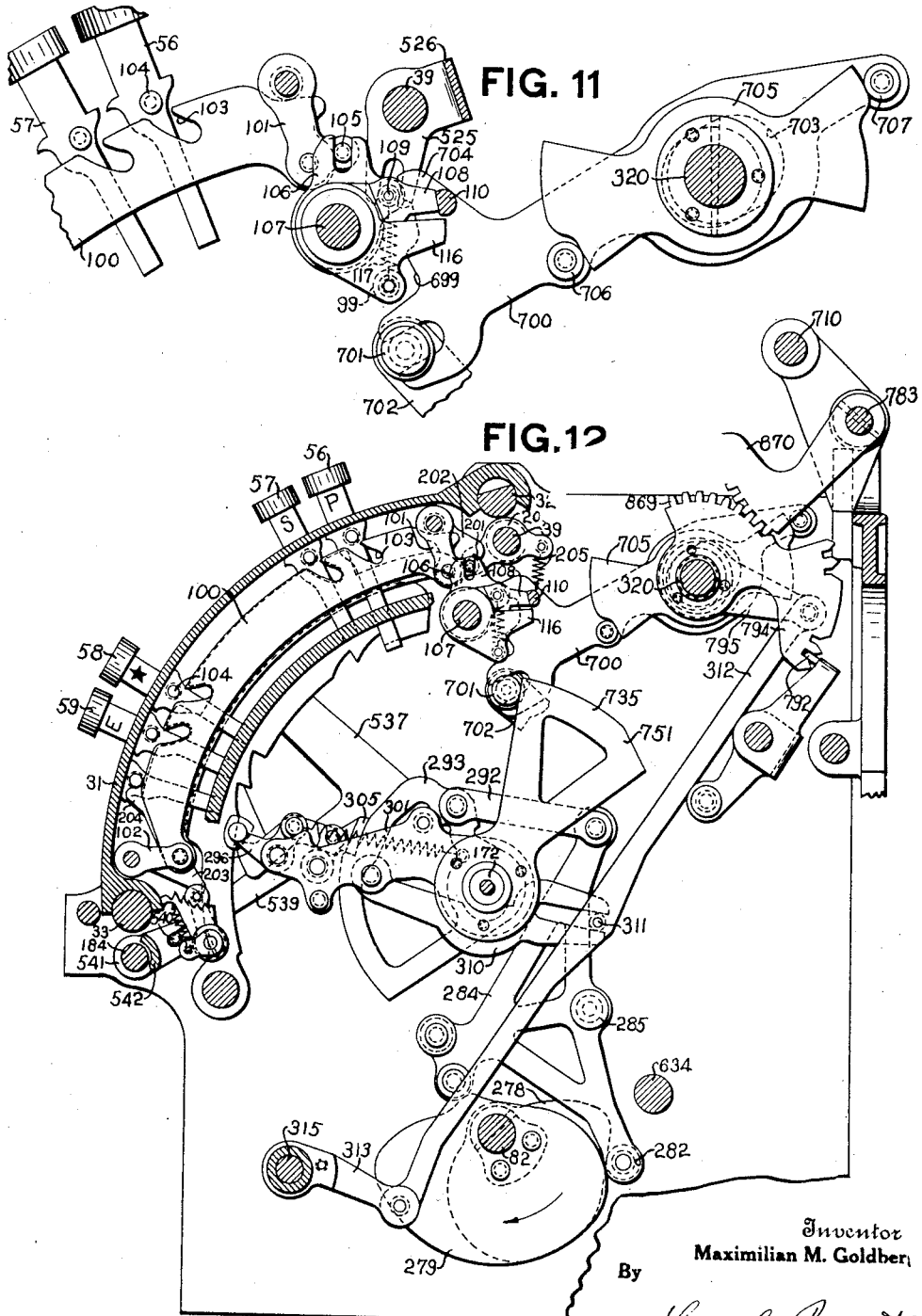

Aug. 30, 1932.  M. M. GOLDBERG  1,874,097
COMPUTING MACHINE
Original Filed June 14, 1926   17 Sheets-Sheet 6

Inventor
Maximilian M. Goldberg
By

His Attorney

Aug. 30, 1932.  M. M. GOLDBERG  1,874,097
COMPUTING MACHINE
Original Filed June 14, 1926   17 Sheets-Sheet 7
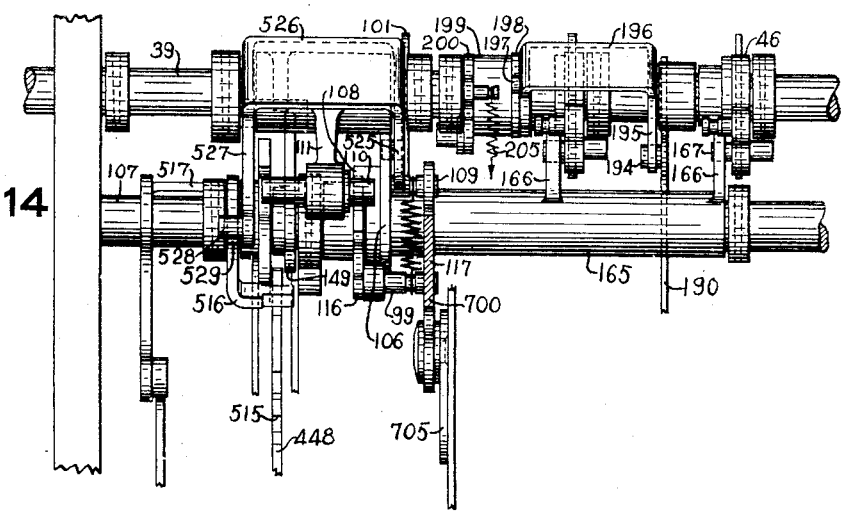
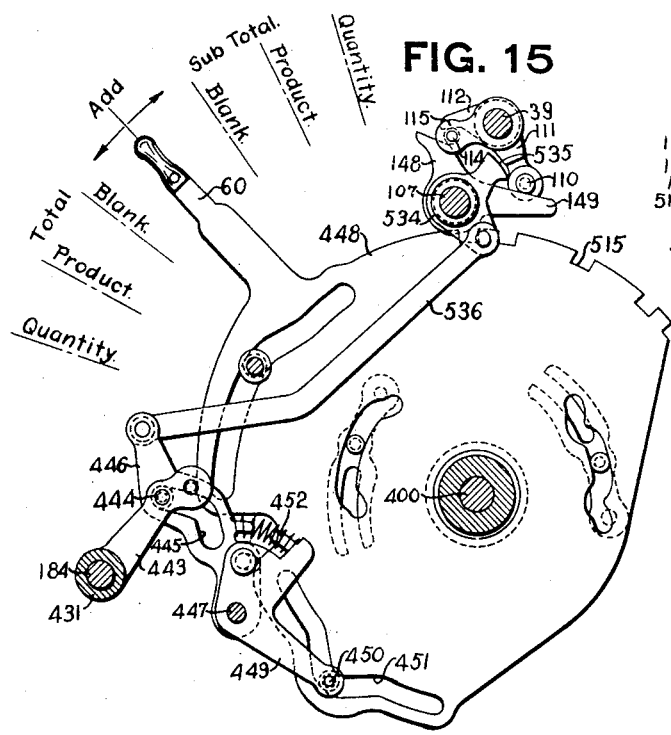
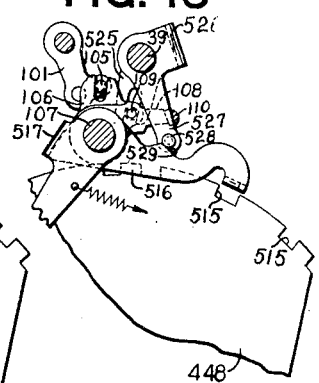
Inventor
Maximilian M. Goldberg
By
Karl Beust
His Attorney Aug. 30, 1932.  M. M. GOLDBERG  1,874,097
COMPUTING MACHINE
Original Filed June 14, 1926   17 Sheets-Sheet 8

Inventor
Maximilian M. Goldberg
By Carl Beust
His Attorney

Aug. 30, 1932. M. M. GOLDBERG 1,874,097
COMPUTING MACHINE
Original Filed June 14, 1926 17 Sheets-Sheet 9

Inventor
Maximilian M. Goldberg
By
Carl Beust
His Attorney

Aug. 30, 1932. M. M. GOLDBERG 1,874,097
COMPUTING MACHINE
Original Filed June 14, 1926 17 Sheets-Sheet 10

Inventor
Maximilian M. Goldberg
By
Carl Beust
His Attorney

Aug. 30, 1932.    M. M. GOLDBERG    1,874,097
COMPUTING MACHINE
Original Filed June 14, 1926    17 Sheets-Sheet 11

Inventor
Maximilian M. Goldberg
By
*Carl Beust*
His Attorney

Aug. 30, 1932.  M. M. GOLDBERG  1,874,097
COMPUTING MACHINE
Original Filed June 14, 1926  17 Sheets-Sheet 12
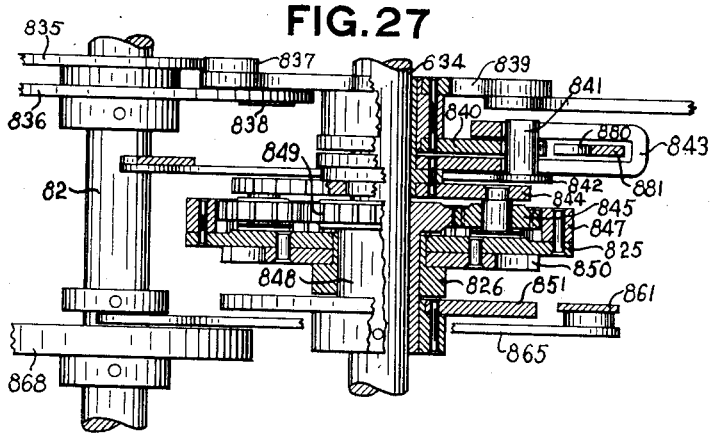
FIG. 27
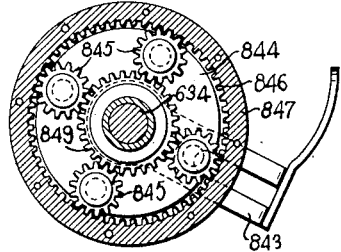
FIG. 28
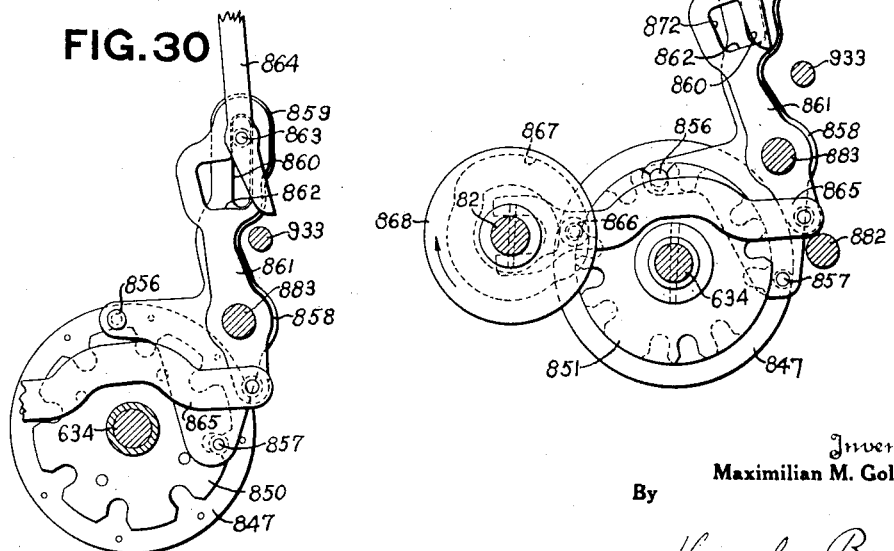
FIG. 29
FIG. 30
Inventor
Maximilian M. Goldberg
By Carl Beust
His Attorney Aug. 30, 1932.  M. M. GOLDBERG  1,874,097
COMPUTING MACHINE
Original Filed June 14, 1926   17 Sheets-Sheet 13

Inventor
Maximilian M. Goldberg
By
Carl Beust
His Attorney

Aug. 30, 1932. M. M. GOLDBERG 1,874,097
COMPUTING MACHINE
Original Filed June 14, 1926 17 Sheets-Sheet 14

Inventor
Maximilian M. Goldberg
By
Earl Beust
His Attorney

Aug. 30, 1932.    M. M. GOLDBERG    1,874,097
COMPUTING MACHINE
Original Filed June 14, 1926    17 Sheets-Sheet 15

Inventor
Maximilian M. Goldberg
By
Earl Beust
His Attorney

Aug. 30, 1932.   M. M. GOLDBERG   1,874,097
COMPUTING MACHINE
Original Filed June 14, 1926   17 Sheets-Sheet 16

Inventor
Maximilian M. Goldberg
By
Earl Benst
His Attorney

Aug. 30, 1932.  M. M. GOLDBERG  1,874,097
COMPUTING MACHINE
Original Filed June 14, 1926   17 Sheets-Sheet 17
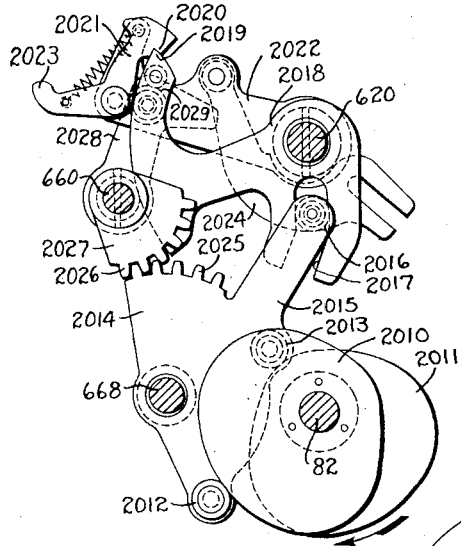
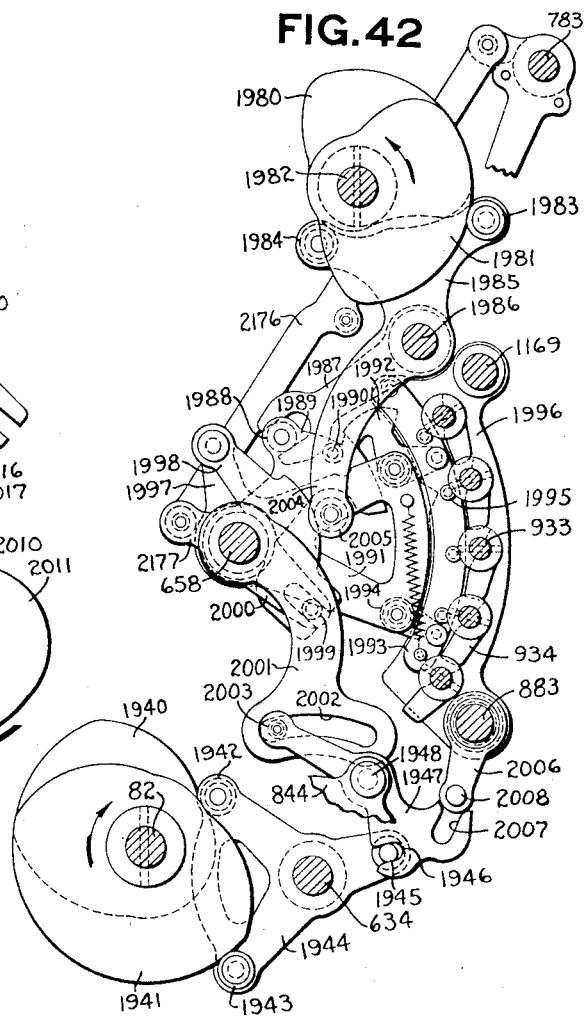
Inventor
Maximilian M. Goldberg
By
Carl Beust
His Attorney Patented Aug. 30, 1932

1,874,097

UNITED STATES PATENT OFFICE

MAXIMILIAN M. GOLDBERG, OF DAYTON, OHIO, ASSIGNOR TO THE NATIONAL CASH REGISTER COMPANY, OF DAYTON, OHIO, A CORPORATION OF MARYLAND

COMPUTING MACHINE

Original application filed June 14, 1926, Serial No. 115,998. Divided and this application filed January 31, 1930. Serial No. 425,002.

This is a division of the Letters Patent of the United States, No. 1,786,525, issued on December 30, 1930 and relates particularly to the interlocking features used in the machine disclosed in that patent.

One object of this invention is to control the release shaft of a machine adapted to make plural cycle operations, by a series of manipulative means, whereby the release shaft is prevented from returning to its normal position during a certain number of cycles of an operation.

Another object of this invention is to provide a machine, such as above mentioned, with means to normally prevent a releasing movement of its release shaft, and manipulative devices to move that means to permit a releasing of the shaft, in combination with means to control all those manipulative devices for preventing a return movement of the release shaft preventing means into its functioning position during a certain number of cycles of operation.

Another object of this invention is to control the release shaft of a machine, such as above mentioned, through a differentially movable device operable under control of manipulative devices that normally function to release the machine for operation.

Another object of this invention is to provide a machine of the type above mentioned with a release shaft operable in one direction to release the machine, such machine being provided with a plurality of sets of manipulative devices adapted to be locked by the release shaft as it moves to release the machine, in combination with means to return the shaft to home position to normally release all of the sets of manipulative devices, which latter means is controlled at certain times to prevent the release of one set of manipulative devices.

A further object of this invention is to provide a machine of the class described with manipulative devices to release the machine, and means to normally lock certain of those devices against operation, in combination with mechanism operated by certain other manipulative devices of the machine, whereby said locking means is disabled.

Another object of this invention is to provide a plurality of devices to prevent releasing movement of the release shaft of a machine of the class described, in combination with means to disable both of those devices at certain times.

Another object is to provide an interlocking device between the "quantity" and "product" keys and the total lever of a machine of the type above mentioned.

Another object of this invention is to provide an accounting machine of the character described with a bank of manipulative devices to release the machine, such devices including item-entering and multiplying devices, in combination with a total lever, and means controlled by the total lever as it is moved into a total taking position to lock out the multiplying device.

A further object is to control the release shaft of an accounting machine operable through a plurality of fixed and a plurality of variable cycles, whereby the shaft is moved to its releasing position and returned to its normal position, means being provided to disconnect the shaft from its operating means after the shaft has been moved to a releasing position.

A still further object of this invention is to control the release shaft of an accounting machine operable through a plurality of fixed and a plurality of variable cycles, whereby the shaft is connected to its operating means and is disconnected therefrom during certain of the fixed and variable cycles of operation.

Another object of this invention is to provide means under control of multiplier keys of an accounting machine, at a time when a multiplying control key is set for operation to determine the time of release of the multiplier keys.

Another object of the invention is to automatically stop the operation of the machine if any of the amount keys remain or are held depressed during the operation of the machine.

Another object is to provide means for releasing the keys manually while permitting the operation to continue.

Another object of this invention is to provide an accounting machine of the character above mentioned with a means to release certain of its keys or manipulative devices during a certain point in the operation, in combination with means for releasing the remainder of the keys or manipulative devices at the end of the operation.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 2 is a detail perspective view of the interlocking mechanism between the control banks.

Fig. 3 is a detail perspective view of a part of the release mechanism.

Fig. 4 is a section through the machine taken just to the right of the "quantity" bank of keys.

Fig. 7 is a detail side elevation of the interlocking segmental plate which cooperates with the release bank of keys.

Fig. 8 is a vertical diagrammatic section through the control banks, and shows the locks of the interlock plates associated therewith.

Fig. 9 is a detail side elevation of the interlock segmental plate which cooperates with the "quantity" bank of keys.

Fig. 10 is a detail side elevation of the interlock segmental plate which cooperates with the "product" bank of keys.

Fig. 11 is a detail side elevation of the release mechanism and the means for holding the machine released on multiplying operations.

Fig. 12 is a section through the machine taken just to the right of and looking toward the release bank, and shows the differential mechanism controlled thereby, which differential mechanism effects a control over the release shaft during a certain number of cycles of operation.

Fig. 14 is a detail in rear elevation of the release and interlocking mechanisms.

Fig. 15 is a side elevation of the total lever plate and a portion of the mechanism cooperating therewith.

Fig. 16 is a detail view of a part of the releasing mechanism and the means for locking the total lever plate during an operation of the machine.

Fig. 22 is a detail view of the driving mechanism for the multiplier differential.

Fig. 23 is a sectional view taken just inside of the right-hand side frame, which supports the multiplying mechanism looking toward the left, and showing particularly the adjusting mechanism for the multiplier pinions.

Fig. 25A is a detail view of a part of the mechanism shown in Fig. 25.

Fig. 25B is a detail view of a part of the mechanism for controlling the operation of the key release shaft.

Fig. 27 is a top plan view, partly in section, of the control shaft driving and governing mechanisms.

Fig. 28 is a side elevation, partly in section, of the planetary gearing used to drive the lower control shaft.

Fig. 29 is a detail side elevation of the connecting mechanism between the release differential mechanism and the control shaft driving aligning mechanism.

Fig. 30 is a detail side view of a portion of the mechanism shown in Fig. 29.

Figs. 36 to 43 show portions of the machine in which a preferred form of mechanism is substituted for some of the mechanism shown in the figures described up to this point.

Fig. 36 is a perspective view of the planetary gear mechanism for driving the control shaft.

Fig. 37 is a detail side elevation of the mechanism for controlling the operation of the planetary gearing system shown in Fig. 36.

Fig. 38 is a detail side elevation, partly in section, of the planetary gearing mechanism.

Fig. 39 is a detail side elevation of a portion of the mechanism shown in Fig. 37, and in its moved position.

Fig. 40 is a right-hand side elevation of the machine proper, showing another form of the mechanism disclosed in Fig. 18.

Fig. 41 is a right-hand side elevation of a portion of the operating mechanism for the machine, and shows another form for some of the mechanism shown in Fig. 13.

Fig. 42 is a side elevation of the governor differential mechanism for the control shaft.

Fig. 43 is a side elevation of the differential mechanism which cooperates with the multiplier banks of keys.

General description

Figure 1:
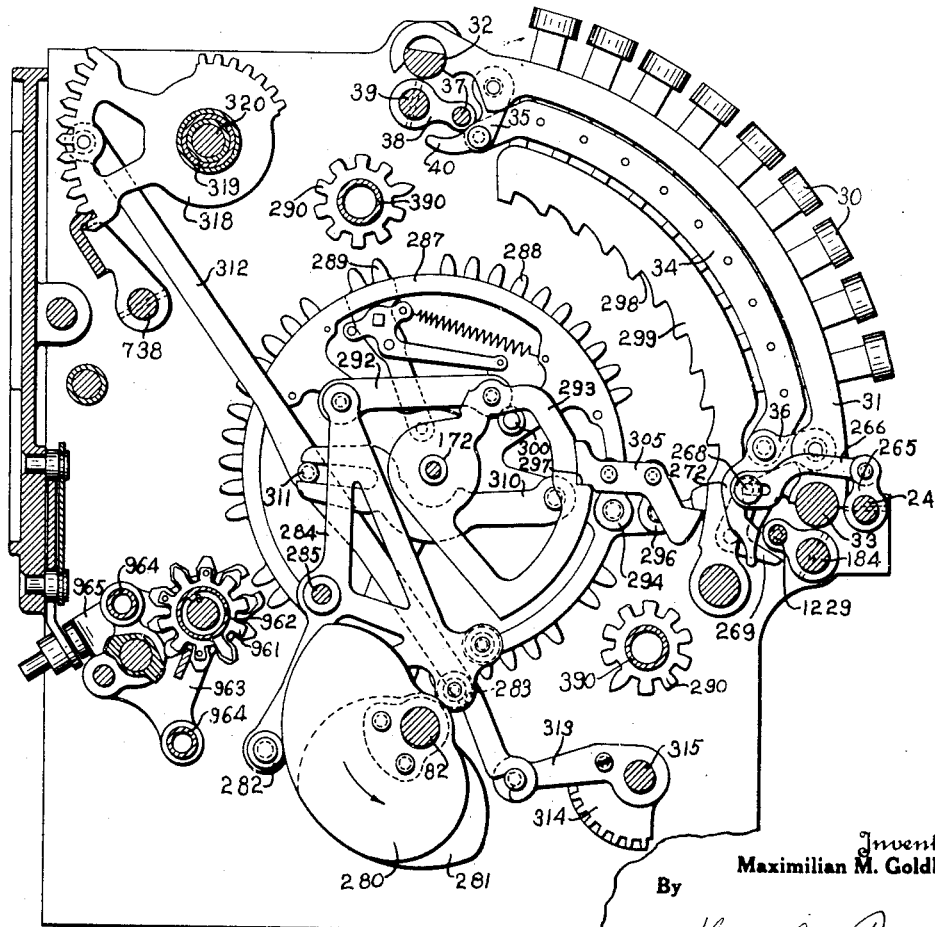
Fig. 1 is a section through the machine just to the left of one of the amount banks and shows the keys, differential mechanism, and a section through the multiplying totalizer.

This machine is of the type shown in the patents to Frederick L. Fuller, Nos. 1,242,170 and 1,394,256, granted on October 9, 1917 and October 18, 1921, respectively, and to B. M. Shipley, No. 1,619,796, granted March 1, 1927. Reference should be made to these patents for a complete understanding of the adding, indicating and total-taking mechanisms described therein as, with various changes and additions to be hereinafter described, said mechanisms are the same herein as those shown and described in said patents.

The machine embodying this invention is designed for factory accounting. It will, generally, be located in the departmental office. When a job is assigned to an operator, a time slip, in duplicate, is inserted in the machine and the following entries made thereon; the date, the time the job was started, the operator's check number, the number of pieces given him for operation, and the job number. When the job is finished the time slip is returned to the machine and the time the job was finished is set up, together with the price per hundred pieces, and the number of pieces actually completed. The machine is then operated and the data just mentioned are printed just beneath the entry made at the beginning of the operation.

The machine automatically multiplies the number of pieces finished by the rate per hundred and prints the product, which is the amount due the operator, on the third line. If there is any additional amount due the operator for the time necessary to set up the job or for any other reason, such additional amount will be printed on the fourth line upon depression of the proper keys.

It can be seen from the above that this system provides very complete printed information about the entire operation, and these records may then be turned over to the paymaster and the accounting department for their information.

The machine is provided with 18 classification totalizers. Some of the totalizers are selected by keys, known as quantity keys, and they accumulate the multiplicand or number of pieces, while the other totalizers are selected by keys, known as product keys, and they accumulate the products. The keys are arranged in two banks, one bank containing nine product keys and the other bank containing six quantity keys, and three product keys. The bank containing the nine product keys is known herein as the "product" bank, while the bank containing the six quantity keys and the three remaining product keys is known as the "quantity" bank. The addition of the multiplicand in a quantity totalizer, and of the product in a product totalizer, takes place during a single multiplying operation.

It is evident that the machine can be used equally well for registering day-work operations. All that is necessary is to set up the elapsed time in hours and tenths of hours and the rate per hour whereupon the machine will compute the amount due the operator, add this amount into the day-work product totalizer, and print the entire transaction both on the record strip and the inserted slip. A device for quickly figuring the elapsed time is attached to the machine. The lapsed time device is not shown herein, but it is fully shown and described in Letters Patent of the United States, No. 1,786,525, issued on December 30, 1930, of which patent this application is a division.

The amount or multiplicand has two decimal places as is usual in cents and dollars keyboards. Means is provided for placing the decimal point in the multiplier, in any one of four places. In the embodiment of the invention as disclosed herein, the largest multiplier that it is possible to use is 99999, while the smallest is .0001. However, these can be varied if desired, and it is not intended to limit the invention to such limitations.

If a product ends in more than two decimals, resulting in what is herein termed a "rough" product, the decimals in excess of two are automatically dropped and "one" is added to the digit in the second position if the amount of the third digit was five or more. The product of .9×.05 equals .045 (rough product), and in such case the machine automatically drops the 5 and adds '1' in the second decimal order and prints .05 as the finished product.

But, take the example .9×.06 equals .054 (rough product), the machine automatically drops the 4 but does not add '1' in the second decimal order, because the number dropped from the third order did not amount to 5, therefore, the machine prints .05 as the finished product.

This dropping of the superfluous decimals and addition of "one" in the second position to get the "finished" or "final" product, takes place immediately after the "rough" product is obtained. It is evident that the keys representing the multiplicand should be released before the superfluous decimals are dropped and the "one" added in the second position, otherwise a wrong result would be obtained as the machine continues to operate—three more cycles being necessary to finish the complete multiplying operation. Mechanism is, therefore, provided for stopping the machine immediately if any one of the amount keys, representing the multiplicand, fails to return to its normal position when released, or if any key is held down in an attempt to manipulate the machine. The machine then remains inoperative until a manual key release is operated to release the depressed keys so that they can return to norr al. The operation of the machine can then be completed.

The printing mechanism, not shown herein, but which is disclosed in the parent patent referred to above, is designed to print the entries mentioned above, with the exception of the date, on a record strip retained in the machine. A novel device is included in this mechanism operated by a small hand lever, which device is capable of disabling the record strip feeding and impression mechanism during adding and multiplying operations. When any one of the totalizers is cleared it is essential that the total thereon be printed, as otherwise it would be lost. The mechanism is, therefore, so designed that the record strip feeding and impression means will operate on total-taking operations even if these means were rendered inoperative, previously, by the hand lever.

The printer has a novel line selecting mechanism. The first entry, which comprises the miscellaneous information, is printed on the first line of the slip. Then the multiplicand and the multiplier are printed on the second line. The product is printed on the third line and any special charge is printed on the fourth line. The carriage moves to these various positions automatically under control of the various keys governing the entries. During the printing of the first two lines all the impression hammers operate, but when printing on the last two lines all of the hammers are rendered inoperative except the ones for the amounts and the designations of the keys of the quantity and product banks.

DETAIL DESCRIPTION
KEYBOARD
Amount keys

There are seven banks of amount keys 30 (Fig. 1) in the keyboard of this machine. They are of the same type as those shown in the patents above referred to, and will therefore, be but briefly described herein.

Each of the keys 30 is slidably mounted in a key frame 31 carried by transverse rods 32 and 33 supported by the side frames of the machine proper. The keys are flexibly held in their normal undepressed positions by suitable springs (not shown). When depressed they are so held by detents 34 which carry studs cooperating with shoulders on the keys in a well known manner. The detents are pivoted at their upper ends to arms 35 carried by the key frames 31 and at their lower ends are pivoted to arms 36 also mounted on said key frames. The keyboard is of the flexible kind, that is, a depressed key is released by the depression of another key in the same bank.

The keys are released at a predetermined point in the operation of the machine by a rod 37 carried by a plurality of arms 38 fast on a shaft 39, known herein as the release shaft. When the keys are to be released this shaft is rocked in a clockwise direction and the rod 37 contacts tails 40 integral with the arms 35, and rocks the same, whereby the detents 34 are shifted downwardly, thereby releasing the depressed keys and permitting them to be returned to their normal positions.

Quantity bank

There is a bank of keys 45 (Figs. 4 and 9) herein called the "quantity" bank. Only 6 of the keys select quantity totalizers; i. e., keys 4, 5, 6, 7 and 8 select totalizers in which the totals of time in hours used by a workman are accumulated, and key 3 selects a totalizer in which the total of the number of pieces fabricated are accumulated. The remaining keys 1, 2 and 9 select totalizers of a similar nature as those in the "product" bank. The captions on the keys in the "quantity" bank and their meaning are as follows:—

Key No. 9. S. U. ___Set up
Key No. 8. D. W.
   Time _____Day Work Time
Key No. 7. P. D.
   Time _____Piece work done day work
Key No. 6. S. O.
   Time _____ Special Orders Key No. 5. O. T.
   Time _____ Overtime
Key No. 4. In time _Indirect Labor
Key No. 3. Qu. (No.
   of Pieces) _____Quantity
Key No. 2. Bath ___Bath time
Key No. 1. Chg.
   O. D. _____Charge other Depts.

The keys 45 (Fig. 4) are slidably mounted in key frames 31 almost identical with the key frames for the amount keys. These keys are held in their normal outer positions by appropriate springs (not shown). When anyone of these keys is depressed it is held in its depressed position through the engagement of a shoulder 46 on an arm supporting the upper end of a detent (not shown) with a notch in the end of an arm 47 loose on the release shaft 39 (Figs. 2 and 4). The arm 47 constantly tends to rock in a clockwise direction due to a spring 48 fastened thereto. When any key in the bank is depressed the detent is lowered and the shoulder 46 thereon engages in the notch in the arm 47, thereby holding the detent down and preventing the release of the depressed key. The release shaft 39 is rocked counter-clockwise (Fig. 4) at a certain point in both adding and multiplying operations for the purpose of releasing the depressed keys. Fast on this shaft and located in a position to cooperate with a pin 49 carried by arm 47 is an arm 50. It is evident from Fig. 2 that the arm 50, bearing on the pin 49 on arm 47, will rock this arm 47 sufficiently to disconnect the notch therein from the shoulder 46. This will permit the detent to return to normal and will thereby release the depressed key.

Product bank

The next bank to the right of the "quantity" bank will be known herein as the "product" bank. These keys 55 (Fig. 5) are for the purpose of selecting the totalizer into which the product of any multiplying operation will be added. They are slidably mounted in a key frame 31, and when depressed, are held in depressed position in exactly the same manner as the keys in the quantity bank previously described. The key captions of the "product" bank and their meanings are as follows:

Key No. 9 P. W__Piece work.
Key No. 8 D. W__Day work.
Key No. 7 P. D___Piece work done day work.
Key No. 6 S. O_____Special order.
Key No. 5 O. T___Overtime.
Key No. 4 In_____Indirect Labor.
Key No. 3 R. O___Reoperation.
Key No. 2 E. O___Extra operation.
Key No. 1 T. P___Temporary piece work.

The keys are released in the same manner as those of the quantity bank.

The manner in which these keys select their appropriate totalizers will be hereinafter described.

Release keys

The release bank contains four keys 56, 57, 58 and 59 (Figs. 11, 12 and 18) all of which are adapted to release the machine for operation. The two upper keys 56 and 57 are used in adding operations and the two lower keys 58 and 59 are used in multiplying operations. The keys 56 and 58 are "free" keys, that is, there is no connection between these keys and the other banks of control keys. These keys, 56 and 58, are for use if the machine is to be used as an adding or multiplying device without segregating the totals in the various classification totalizers. The other two keys 57 and 59, respectively, are connected with the two banks of control keys by interlock mechanism which will be described later. When any one of these four keys is depressed the machine will be released and the motor circuit automatically closed to consumate the operation.

Total lever

There is also provided a manually movable lever 60 (Figs. 15 and 16) which controls the engagement of the totalizer lines on total-taking operations. The functions and the operation of the total lever will be easily understood from a perusal of the patents above mentioned, but it will be briefly described hereinafter in connection with total-taking operations.

Multiplier keys

There are five banks of multiplier keys 62 (Figs. 13 and 23) which are primarily for the purpose of setting up the multiplier in multiplying operations, and they will be described in detail later in connection with the multiplying mechanism. These keys 62 set up printing wheels (not shown in this divisional application) and may be used in adding operations to set up an extraneous number. It will be noted that the multiplier key banks are each provided with a key in the zero position.

Decimal keys

Located above and one key between adjacent banks of multiplier keys are four keys 68 (Figs. 13 and 23) which are for the purpose of placing a decimal point in any position in the multiplier, and controlling the pointing off of the product. It is thus possible to multiply by any decimal from .0001 to .9999. The construction and operation of these keys will be fully described later in connection with the muliplying mechanism.

Operating mechanism

This machine is adapted to be operated normally by an electric motor of any suitable design. The motor is mounted on the left-hand side of the machine and is connected to the driving mechanism of the machine by a clutch. This clutch consists of a shell 70 (Fig. 20), which is driven by the motor. Mounted in the left-hand side frame of the machine is a stud 71 carrying a disk 72 having a recess 73, the bottom walls of which are eccentric, relatively to the center of the stud 71. Rollers 74, loosely mounted on pins 75 carried by a disk 76 project into the recesses 73 and are moved over the eccentric walls, and consequently radially outwardly, by spring pressed pins 77 carried by disk 72. It is evident that when the shell 70 is rotated counter-clockwise (Fig. 20) by the motor, the rollers 74 will connect the bottom walls of the recesses 73 of the disk 72 with the inner periphery of the shell 70, and rotate the disk 72 with the shell 70 in a counter-clockwise direction.

Secured to the disk 72 is a pinion 78 meshing with a gear 79 loose on a stud 80 mounted in the side frame. This gear 79 meshes with a gear 81 fast on a shaft 82 supported by the side frames of the machine. The shaft 82 is the main drive shaft of the machine and receives one complete rotation on each adding operation and a variable number of rotations on multiplying operations, as will be later described.

Figure 18:
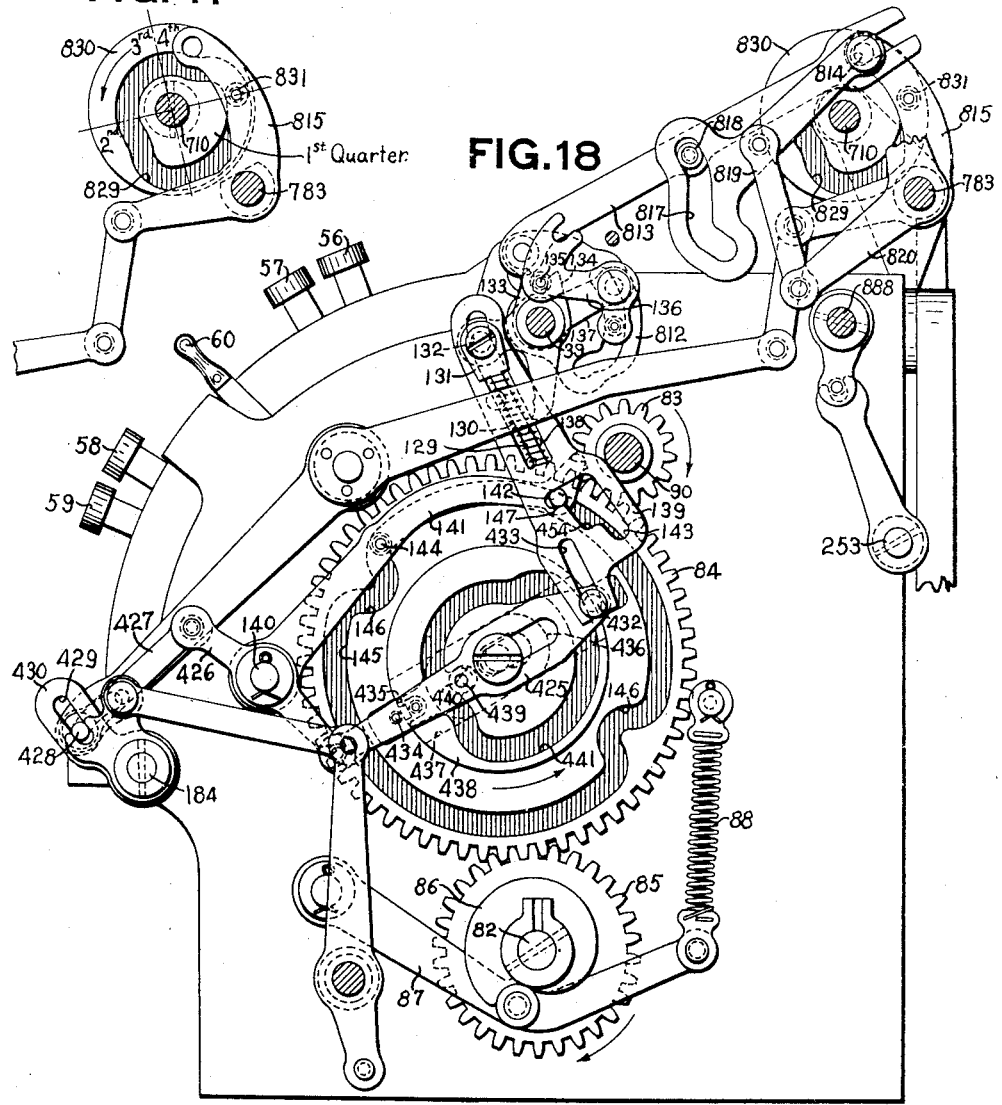
Fig. 18 is an elevation of the release shaft controlling and restoring means, and also shows a part of the driving means for the main operating shaft.

It may sometimes be desirable to operate the machine by hand, and for this purpose there is provided a crank 89 (Fig. 13) arranged to drive a shaft 90 (Fig. 18). This shaft carries a pinion 83 which meshes with a gear 84 rotatably mounted on a stud in the right-hand side frame of the machine proper. Meshing with the gear 84 is another gear 85 fast on the main drive shaft 82. The ratio of these gears is such that two rotations of the crank handle will give the drive shaft 82 one complete rotation.

In order to insure the return of the machine to home position there is a cam 86 fast on the gear 85. An arm 87 is pivoted to the machine frame and carries a roller held in contact with the cam by a powerful spring 88 attached to the end of the arm 87. As the shaft 82 rotates, the cam 86 will stretch the spring 88 until, near the end of the rotation, the roller passes the highest point of the cam, whereupon the spring returns the arm 87 and cam 86 to normal, thus insuring the return of the main drive shaft 82 to its normal position.

Release mechanism

The machine is normally locked and is released for operation on adding operations by either of the keys 56 or 57 (Figs. 11 and 12), and on multiplying operations by either of the keys 58 or 59.

In order to release the machine the release bank of keys carries a detent 100 pivoted at its upper and lower ends respectively to arms 101 and 102, which are, in turn, pivotally mounted on the key frame 31 for this bank. This detent has four curved notches 103 cut therein in such a position that each of them will cooperate with a pin 104 carried by each of the release keys. It can be seen from these figures that when any one of the release keys is depressed, the pin 104 thereon will enter the notch 103 appropriate thereto and cause said detent to be moved in a downward direction.

The arm 101 has an extension which carries a pin 105 (Figs. 3, 11 and 16). This pin projects through a bifurcated arm 106 loose on a shaft 107 supported by the side frames. The arm 106 is rigidly connected to a locking detent 108 for the release shaft 39, by a pin 109 (Fig. 11) carried by the detent. The detent 108 has a square end which cooperates with a flattened stud 110, best shown in Figs. 3 and 11, carried by an arm 111 loose on the release shaft 39. The release shaft normally tends to rock in a clockwise direction (Fig. 11) due to mechanism which will be later described.

When a release key is depressed and the detent 100 shifted, the pin 105 on arm 101 will rock the arm 106 counter-clockwise (Fig. 11). As this arm 106 is secured to the detent 108 this detent will also be rocked until the squared end thereof passes out of the path of the stud 110. The arm 111 has a forwardly extending finger 112 (Fig. 15) which lies just above a pin 114 carried by an arm 115 fast on the release shaft 39. As the release shaft constantly tends to rock in a clockwise direction, it is evident that as soon as the detent 108 passes out of the path of the stud 110 the arm 111 will be rocked clockwise by the pressure of the arm 115 and pin 114 on the finger 112 of said arm. The stud 110 will assume a position between the locking detent 108 and a non-repeat detent 116 (Figs. 3 and 11) which lies in the same plane. The purpose of the non-repeat detent 116 is to prevent a second operation of the machine in case the operated release key is held down. This detent 116 is rendered ineffective of course on multiplying operations in a manner which will be hereinafter described. The detents 108 and 116 are normally held in the positions shown in Fig. 11 by a spring 117 connected to the pin 109 on the detent 108 and to a pin 99 on the detent 116.

Figure 20:
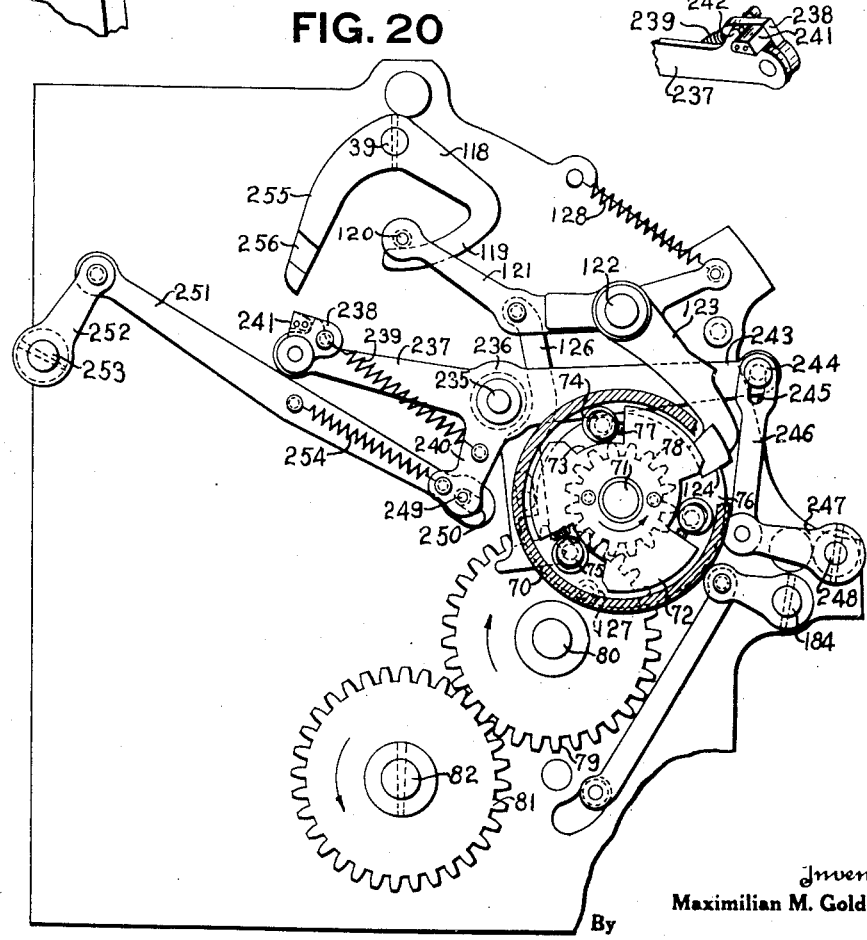
Fig. 20 is an elevation of the left-hand side of the machine with the motor removed, but showing a portion of the motor clutch mechanism.

When the release shaft 39 is rocked counter-clockwise as seen in Fig. 20, retaining lever 118, having a hook 119 normally under a roller 120 carried by an arm 121, pivoted to the side frame at 122, is moved away from under said roller, which permits said arm 121 to be rocked counter-clockwise under the influence of a spring 128. The arm 121 is rigid with a locking arm 123 which is normally in engagement with a shoulder 124 formed on disk 76 and a shoulder on a disk not shown. As the lever 123 and arm 121 are connected, the former will be rocked counter-clockwise out of locking position upon the movement of the release shaft, and will thereby permit the motor to drive the machine. The movement of the arm 121 also actuates mechanism for closing the motor circuit. This mechanism is old and as it is shown and described in the above mentioned Shipley Patent No. 1,619,796, it has been omitted herein.

The means for restoring the locking lever 123 and arm 121 to their normal positions is as follows: Pivoted to arm 121 is a depending link 126, the lower end of which is enlarged. Projecting laterally from the side of the gear 79 is a pin 127. This pin is located in such a position that near the end of the operation of the machine it will come into contact with the lower edge of the link 126 and raise the same, thereby rocking the arms 121 and 123 to such an extent that when the release shaft 39 is returned to normal the hooked end of the retaining lever 118 will come beneath the roller 120 and hold the parts in their normal positions.

Means for restoring release shaft

The release shaft 39 is restored to its normal position near the end of each adding operation in the following manner. When the shaft is released it is rocked clockwise (Fig. 18) by means of a spring 130 supported by a finger 129 of a link 139, and two pilot arms 131, one behind the other, pivoted on stud 132 carried by one arm of a three-armed lever 133 loose on the shaft 39. One arm 134 of the lever 133 is bifurcated and embraces a pin 135 carried by coupler 136 pivoted to the end of an arm 137 fast on the release shaft 39. It can be seen from the above that when the release shaft is free to rotate the spring 130 will rock lever 133, which, through the pin 135 and coupler 136, will rock the arm 137, and therefore, the shaft 39, in a clockwise direction as viewed in this figure.

The spring 130 is normally compressed between shoulders on the pilot arms 131 and the end of a slot 138 in the link 139, the upper end of which also surrounds stud 132. Pivoted on a stud 140 in the side frame is release shaft restoring lever 141 which at its free end carries a pin 142 projecting through an opening 143 in the link 139. This lever 141 also carries a roller 144 projecting into a cam groove 145 in the side of gear 84. This gear 84 receives a one-half rotation on each cycle of operation of the machine. Just before the gear finishes its one-half rotation, a node 146 of the cam groove 145 cooperates with the roller 144 on the lever 141, and thereby first lowers and then raises said arm.

When the shaft 39 is released, the stud 132 moves to the upper end of the slot in link 139, through which it projects, under the influence of spring 130. When, therefore, the lever 141 is lowered, as just described, the link 139 is lowered due to the engagement of pin 142 on lever 141 with a shoulder 147 formed in the opening 143 of link 139.

When the shaft 39 is returned to its normal position the pin 114 on arm 115 will contact with a restoring lever 148 (Fig. 15) loosely mounted on shaft 107, and rock said lever counter-clockwise, whereupon its tail 149, by contact with the pin 110, rocks the arm 111 counter-clockwise to permit the locking detent 108 to rock clockwise (Fig. 11) under the influence of spring 117 until it resumes its normal position with the squared end thereof in front of the pin 110. The movement of detent 108 to normal will of course return the arm 106, arm 101, and the detent 100 to their normal positions so that the depressed release key will return to its outer undepressed position.

Figures 5, 6:
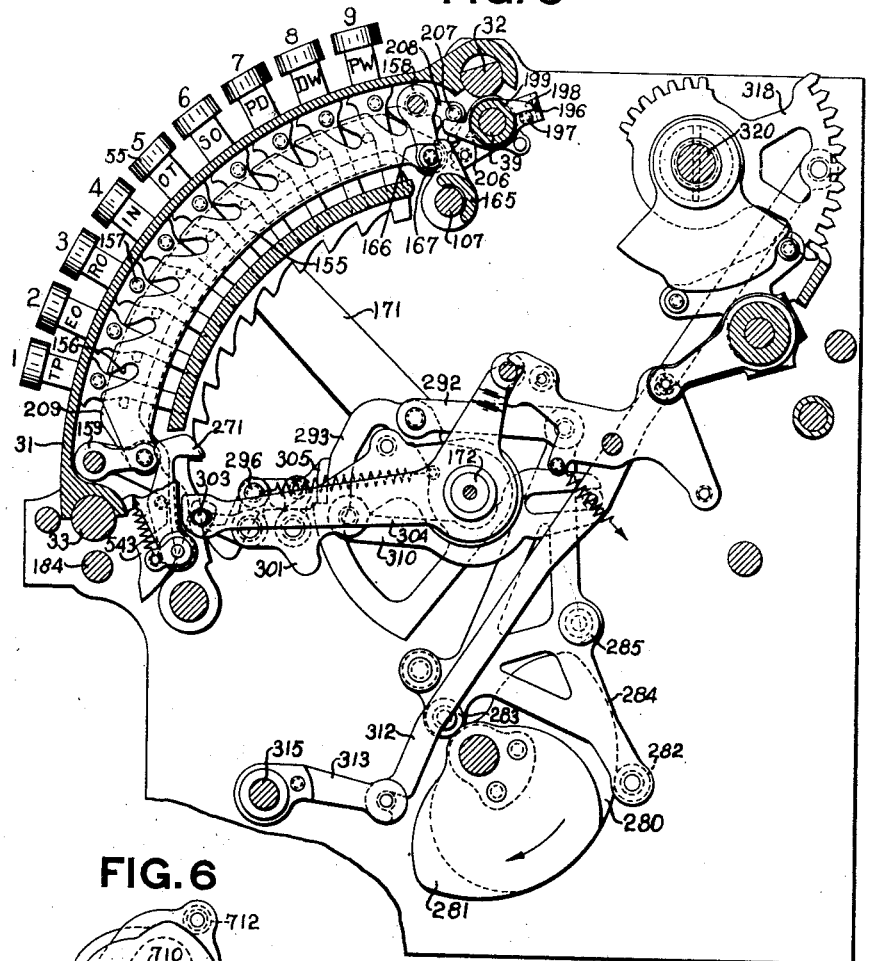
Fig. 5 is a section of the machine taken just to the right of the "product" bank.
Fig. 6 is a detail view of the cam and pitman for operating the release shaft controller.

Prevention of depression of quantity and product keys after release key is depressed After a release key is once depressed it is necessary to prevent the depression of keys in the quantity and product banks. Cooperating with the keys of each of these banks are identical locking detents 155, one of which is shown in Fig. 5, which is the product bank, but the one for the quantity bank is of the same construction. This detent has a plurality of uniformly curved slots 156 cut therein each of which is adapted to cooperate with a pin 157 on each key. The detents are pivotally mounted on swinging arms 158 and 159 carried by the key frames 31.

When any key in one of these banks is depressed the detent 155 will be moved down thereby placing a solid portion of the detent opposite the pins 157 on the undepressed keys and preventing the depression of any other key in the same bank.

It is essential that such depression of a quantity or product key does not take place during the operation of the machine. In order to prevent this, the arm 106 is fast on a yoke 165 supported by the shaft 107 (Fig. 3). This yoke has two projecting arms 166 which cooperate with pins 167 carried by the arms 158 for these two banks. When a release key is depressed and the arm 106 rocked clockwise, the yoke 165 and arms 166 will also be rocked clockwise and the latter, through their engagement with the pins 167 carried by arms 158, will rock these arms and move the locking detents 155 down to their locking positions, and it is impossible to depress a key in either of these banks.

When the release shaft is returned to normal the yoke 165 will also be returned and the arms 166 thereof will be moved away from the pins 167, whereupon springs (not shown) will act upon the detents 155 to return them to their normal positions.

Interlock between keys of quantity and product banks

Means are provided normally to prevent the depression of the fourth, fifth, sixth, seventh and eighth keys counting from the bottom in the product bank unless the third-fourth, fifth, sixth, seventh or eighth key in the quantity bank has been previously depressed. This arrangement is necessary, because these keys control the selection of the corresponding quantity and product totalizers, and when a multiplication is made it is desired to make it necessary to enter the multiplicand in the appropriate quantity totalizer and the product in the corresponding product totalizer.

The means for accomplishing this result will now be described. Cooperating with the product bank is a segmental plate 170 (Fig. 10) carried by an arm 171 loosely mounted on a hub 172 surrounding a tie rod which ties the various differential units together, as will be later described. This plate 170 has a plurality of projections 173 thereon, each of which cooperates with one of the pins 157 carried by each of these keys. It can be seen from this figure that the projections 173 normally lie in the path of the pins 157, and therefore, none of the keys "4" to "8" inclusive of the product bank can be depressed. Keys 1, 2, 3, and 9 of the product bank (Fig. 5), however are not affected by this detent and can, therefore, be depressed at any time.

This segmental plate 170 (Fig. 10) is moved to its ineffective position by the depression of any of the keys 3 to 8 in the quantity bank (see Fig. 9). This bank is provided with a segmental plate 174 carried by an arm 175 fast on the hub which carries arm 171, and is connected to the plate 170 by two pins 176 so that these two plates move in unison. The plate 174 has a plurality of projections 177 thereon, one for each of keys 3 to 8 inclusive, one side of which is beveled. These beveled portions cooperate with pins 178 carried by each of said keys. When one of the keys 3 to 8 is depressed the plate 174, and therefore, the plate 170, will be moved downwardly far enough to remove the projections 173 from the path of pins 157, and thereby permit the depression of keys 4 to 8 in the product bank. The plates 170 and 174 are flexibly held in their normal positions by a spring 179 stretched between a projection 180 of arm 171 and any suitable point of the mechanism. A link 181 (Figs. 4 and 10) has a slot surrounding a pin 182 carried by arm 171. This link is pivoted to a yoke 183 fast on a shaft 184 supported in the machine frames. On total-taking operations it is necessary that any key in the product bank be depressible without first requiring the depression of a key in the quantity bank so that any product totalizer on the product totalizer line may be selected. When the total lever 60 (Fig. 15) is moved out of its adding position, it rocks the shaft 184 clockwise by means hereinafter set forth. As the yoke 183 is fast on this shaft the link 181 will rock the arm 171 counter-clockwise far enough to remove the projections 173 from the path of pins 157, thereby permitting the depression of these keys.

Means for permitting the release of the machine when the first, second, or ninth keys in the quantity bank are depressed The first, second and ninth keys in the quantity bank (Fig. 4) select totalizers for use in adding operations or to receive the product in multiplying operations, and it is desirable to enable the operator to release the machine by depressing the "S" key for adding and the "E" key for multiplying, without having to depress any key in the product bank, as is necessary when any of the keys 3 to 8, inclusive, of the quantity bank are depressed.

Pivoted on the hub 172 (Fig. 4) is an arm 190 carrying a segmental plate 191 which has three projections 192 thereon cooperating with the pins 157 of the first, second and ninth keys in the quantity bank. These projections are beveled and upon the depression of any of these keys the plate 191 will be moved in a clockwise direction about the hub 172.

The upper end of the segmental plate has a projecting arm 193 which carries a pin 194 contacting a projection 195 of a yoke 196 (Figs. 2, 4 and 14) loose on shaft 39. When the segmental plate 191 is rocked clockwise the pin 194 by its contact with the projection 195 rocks the yoke 196 in a counter-clockwise direction, as viewed in Fig. 4.

The yoke 196 carries a pin 197 which normally lies just beneath a projection 198 (Figs. 5 and 14) fast on a hub 199 loose on the shaft 39. Also fast on the hub 199 is a lever 200 (Figs. 12 and 14) which carries a half-round stud 210 (Fig. 2) engaging in a notch 201 (Fig. 12) formed in an arm 202. This arm, and an arm 203, are pivoted to the key frame 31 for the release bank, and carry a detent 204 cooperating with the keys of this bank. Opposite the pins on keys 57 and 59 this detent has curved slots cut therein which cause the detent to move downwardly when either of these two keys is depressed. However, the stud carried by lever 200 is normally in engagement with the notch in arm 202 and it is evident that these keys cannot be depressed until the said stud is moved out of the notch 201. Therefore, when one of the keys 1, 2 or 9 in the quantity bank is depressed the yoke 196 is rocked counter-clockwise (Fig. 5). The pin 197 thereon will rock the projection 198, hub 199, and lever 200 to the same extent, which will move the stud carried by said lever out of notch 201 (Fig. 12) in arm 202, thereby freeing the detent 204 and permitting depression of keys 57 and 59.

It will be noted that the detent 204 (Fig. 12) has recesses opposite the pins 104 of keys 56 and 58, thereby making these keys independent of the detent 204 and the keys in the quantity bank. The lever 200 is flexibly held, with its stud 210 (Fig. 2) in the notch 201, (Fig. 12) by a spring 205 attached to the opposite end of said lever.

The yoke 196 has an arm 206 (Fig. 5) integral therewith, which cooperates with the product bank. This arm normally lies just beneath a pin 207 carried by an arm 208 which supports the upper end of a detent 209 cooperating with all of the keys in this bank. When any key in the product bank is depressed the detent 209 is moved downwardly by means of a curved portion of the key shank acting on a corresponding pin on the detent. Therefore, any of the keys 1, 2 or 9 when depressed causes the arm 208 to rock clockwise and the pin 207, in engagement with the arm 206, will rock the yoke 196 counter-clockwise. As before described, this movement of the yoke will remove the stud, carried by lever 200 from the notch in arm 202, thereby permitting the depression of either of the keys 57 or 59, depending on the character of the operation.

Manual key release

It will be remembered that all of the keys are released by a rocking movement of the release shaft 39. Means are provided for rocking this shaft manually to release the keys should there be an error in their depression.

A continuation of the release shaft extends through the multiplying attachment and is connected to the release shaft proper by a simple clutch (not shown). It is constructed in this manner simply for convenience in assembly. Fast on the right-hand end of this extended shaft 39 is an arm 215 (Fig. 13) to which is pivoted a downwardly extending link 216. Near its lower end this link has a slot 217 formed therein through which projects a pin 218 carried by a lever 219 pivoted at 220 to the right-hand side frame.

The lever 219 normally tends to rock clockwise due to the action of a spring 229 attached thereto, but this action is limited by a stop pin 221 with which a downwardly projecting toe 222 of lever 219 contacts. The lever 219 is provided with a handle 223 which extends through an opening in the cabinet and may be grasped by the hand of the operator. When the lever 219 is rocked counter-clockwise (Fig. 13), the pin 218 thereon will contact the lower end of the slot 217 and upon the continued movement of the lever will rock the arm 215 and shaft 39 counter-clockwise far enough to release all of the depressed keys, except the release keys 56 to 59 over which the manual release lever 219 has no control.

Means are also provided to prevent the movement of lever 219 after the machine has been released. This means consists of an arm 224 pivoted to the frame and which has its extreme end 225 bent at right angles to cooperate with a surface 226 of lever 219. The arm 224 has a slot 227 therein through which projects a pin 228 carried at the lower end of link 216. When the machine is released the shaft 39 is rocked clockwise (Fig. 13) thereby through the arm 215 raising the link 216, thus rocking the arm 224 counter-clockwise far enough to bring the bent end thereof into contact with the surface 226 of lever 219, thereby preventing the movement of this lever until the release shaft is returned to normal.

It can also be seen that if the key release lever 219 has been moved it is impossible to release the machine, as the bent end 225 of lever 224 will strike the end of the toe 222 and prevent the complete movement of the release shaft.

Means for stopping machine if an amount key is held down

During a multiplying operation the amount keys are released at the end of the last multiplying cycle of operation. If any one of these keys should fail to come out when released, either because it sticks or because of an attempt at manipulation by the operator, a wrong result would be printed. In order to prevent this, mechanism is provided herein to stop the machine if any one of the depressed amount keys fails to come out. The operation cannot be continued until all of the amount keys are released by the manual key release.

Figure 19:
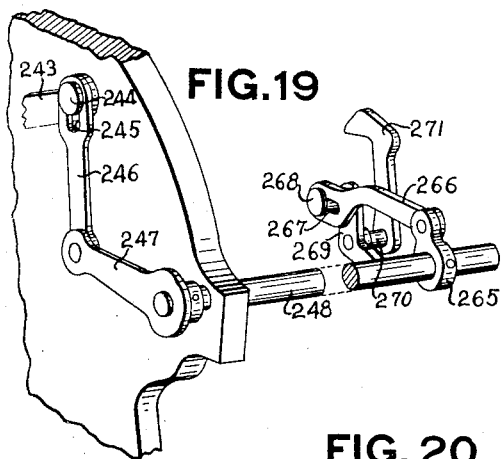
Fig. 19 is a detail perspective view of the mechanism used to disable the driving mechanism when any of the amount keys remain in a depressed position after the releasing mechanism has been operated to release them at the end of the multiplying cycles.
Figure 21:
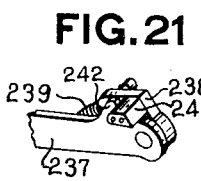
Fig. 21 is a detail perspective view of part of the mechanism shown in Fig. 20.

Pivotally mounted on a stud 235 (Fig. 20) is a three-armed machine locking lever 236. An arm 237 of this lever carries a pawl 238 (Figs. 20 and 21) which may be rocked counter-clockwise against the tension of a spring 239 extending between a pin on the pawl and a pin on a downwardly extending arm 240 of lever 236. This pawl carries a laterally projecting lug 241 which contacts a projection 242 of arm 237 and prevents clockwise movement of the pawl. The locking lever 236 has another arm 243 carrying a pin 244 (Figs. 19 and 20) extending through a slot 245 in a link 246 pivoted to an arm 247 fast on a shaft 248 supported by the machine frames.

The downwardly extending arm 240 carries a pin 249 projecting through a slot 250 in the end of a link 251 which at its opposite end is pivoted to an arm 252 fast on a shaft 253 supported in the machine frames. A spring 254 is stretched between a stud on arm 240 and a stud on link 251.

When the machine is released the shaft 39 and arm 118 are rocked counter-clockwise (Fig. 20). Then during the first cycle of operation the shaft 253 is also rocked counter-clockwise by means hereinafter described, and this shaft 253, through the arm 252, link 251, spring 254 and arm 240 rocks the lever 236 clockwise until the pin 244 comes into contact with the lower end of the slot 245. The link 246 is held against downward movement whenever an amount key is depressed, as will be later described. The link 251, however, continues its movement for a short distance after the lever 236 has been stopped, thereby moving the lower end of slot 250 toward the pin 249 and tensioning spring 254.

The retaining lever 118 has a downwardly projecting arm 255 through which is cut a channel 256. When the machine is released and the shaft 253 is rocked counter-clockwise, the lower end of arm 255 will be just to the right of the pawl 238. As the operation continues the point is reached at which the amount keys are to be released, which releasing is accomplished in the usual manner by rocking the shaft 39 clockwise past its normal position, and the end of the arm 255 will wipe by the pawl 238, as the pawl can turn in this direction.

If all of the amount keys are released and none are held down, the shaft 248 is permitted to move slightly in a counter-clockwise direction. The spring 254 will then rock the lever 236 slightly in a clockwise direction and position the pawl 238 so that its lug 241 will pass through the channel 256 in the arm 255, thereby causing no interference with the action of the lever 118, when the latter rocks counter-clockwise through its normal position to its released position to permit continued operation of the machine.

If, on the other hand, an amount key through any cause does not come out when released, the shaft 248 will be held against counter-clockwise movement. As the pin 244 is already in the lower end of the slot 245 any clockwise movement of lever 236 is prevented. Therefore, when the lever 118 moves counter-clockwise, as above described, after the release of the amount keys, it will be stopped in its normal home position by the engagement of the lower end of arm 255 with the lug 241 on pawl 238, and thus prevent movement of the retaining lever 118 and hook 119, and consequently, the machine will be held locked in home position by the locking lever 123.

The means for holding the shaft 248 against counter-clockwise rotation when any amount key remains in its depressed position will now be described. Fast on the shaft 248 in front of each amount bank is an arm 265 (Figs. 1 and 19) to which is pivoted one end of a short link 266. A slot 267 is formed in the other end of this link and a pin 268 carried by a bell crank lever 269 extends through this slot. Lever 269 is fast on a short shaft 270 supported by the key frame 31. This shaft also carries the well known zero stop pawl 271 for this particular bank. Co-operating with pin 268 is a tail 272 of the arm 36 which supports the lower end of the detent 34.

It will be recalled that when an amount key is depressed the detent 34 is moved downwardly. This movement will cause arm 36 to rock counter-clockwise about its pivot, whereby the tail 272 moves the pin 268 into the right-hand end of slot 267, as viewed in Fig. 19. It is evident that as long as a key remains depressed it is impossible to move the link 266 to the left, and therefore, the shaft 248 cannot be rotated counter-clockwise. For this reason the lug 241 will remain in the path of the lower end of the arm 255 and the machine will be locked against further movement. If, however, all of the amount keys are released the shaft 248 can rotate counter-clockwise to the extent of the slot in link 266, which movement will permit the lug 241 to be positioned opposite the channel 256. Therefore, the movement of the arm 118 will not be interfered with and the machine will be released and the operation will continue through to the end.

Differential mechanism

The differential mechanism of the machine proper is employed to select and differentially operate the different totalizers. The differential mechanism also sets up the indicators and the appropriate type wheels (not shown) under control of the keys. The amount differential mechanism will be described first.

Amount differential unit

There is one complete differential unit for each amount bank, but as they are identical in construction and operation, only one will be described.

To drive the differential mechanism of the machine, the main drive shaft 82 is provided with a plurality of pairs of cams 280 and 281 (Fig. 1) each pair co-operating with rollers 282 and 283, respectively, carried by Y-shaped levers 284, of which there is one for each bank of amount or control keys in the machine. Each of these levers is pivoted at 285 on a corresponding frame or hanger 286, like that shown associated with the quantity bank in Fig. 4. Loosely mounted on the hubs 172 supported by the frames 286 which support the differential units, adjacent the amount banks of keys (Fig. 1) are differentially movable totalizer actuators 287 carrying racks 288 and transfer arms 289 for operating regular totalizer pinions 290, and multiplying totalizer pinions, which will be later described. The construction and operation of the transfer mechanism are shown and described in the patents cited to which reference may be had for disclosure thereof.

The levers 284 at the end of their upwardly extending arms are pivotally connected by links 292 to driving segments 293 loose on said hubs 172. The driving segments 293 adjacent the banks of amount keys are connected to the differentially movable actuators 287, by latches 305 each of which is supported by an arm 294 and a lever 296 pivoted on the corresponding differentially movable actuator. Springs (not shown) hold the rear ends of said latches in engagement with shoulders 297 on the driving segments. When the segments 293 are driven by their cams 280 and 281, the differentially movable actuators 287 are carried, with their latches, up to a point where the forwardly extending arms of the levers 296 engage the depressed amount keys. Such engagement results in disengagement of the latches from the driving segments and engagement of the forward end of each latch with the particular one of a series of notches 298, opposite the latch and formed in a plate 299 supported by the frame 286.

Upon return movement of the driving segment to its normal position, a pin 300 mounted on the differentially movable actuator 287 is engaged by the inside of the driving segment, and said actuator is returned thereby to its normal position. If no key is depressed in an amount bank, the zero stop pawl 271 (Fig. 19) for that particular bank will operate the latch to arrest the differentially movable actuator in its zero position. When a key is depressed, the zero stop pawl is moved out of operative position in a manner well known in machines of this type.

Control bank differential mechanism

The differential mechanism which co-operates with the keys of the quantity, product and release banks is very similar to that used with the amount banks, the differentially movable actuators 287 and racks 288 being omitted, and arm 301 (Fig. 5) used in place thereof. If no key in the quantity or product bank is depressed, the latch appropriate thereto is disconnected from its driver 293 in the zero position due to the engagement of an arm 302 for the quantity bank (Fig. 4), and 304 for the product bank (Fig. 5) with the zero stop pawl 271. Each arm is pivoted on the hub 172 carried by the frames 286. A pin 303 carried by each lever 296 extends through a slot in the arms 302 and 304, so that when said arms come into contact with the zero stop pawls, the levers 296 will be rocked counter-clockwise to disconnect the respective latch from its driving segments 293.

Appropriate to each amount differential mechanism and to the differential mechanisms for the quantity, product, and release banks, is a beam 310, pivoted at one end to the differentially movable actuator 287 for the amount banks and to the arm 301 for the other banks, and bifurcated at its opposite end to straddle a roller 311 carried by a link 312. At its lower end this link is pivoted to an arm 313 fast on a spiral segment 314 loose on a shaft 315. The spiral segment transfers the movement of the differentially movable actuator to the type wheel (not shown in this divisional application). At its upper end the link 312 is pivoted to a segment 318 fast to one of a plurality of sleeves 319 supported by the shaft 320. These members adjust indicating mechanism not shown herein.

Totalizers

The totalizers shown in the present machine, with the exception of the multiplying totalizer, are well known and are fully described in the Fuller and Shipley patents heretofore mentioned. They are shown in this divisional application only in Fig. 1, and will therefore not be described in detail. There are three lines of totalizers shown, the totalizers on two of the lines consist of a plurality of interspersed totalizers, each comprising the pinions 290 loosely mounted on a tube 390 supported by suitable frames.

The two regular totalizer lines, i. e., the upper and front totalizer lines in this machine, are slidable laterally under control of the product and quantity banks of keys. The mechanism for controlling this lateral shifting is old and well known, and is not shown herein. The multiplying totalizer shown at the lower rear part of Fig. 1 will be later on referred to in connection with multiplying operations.

Total and sub-total mechanism for quantity and product totalizers

The total and sub-total mechanism used for taking totals and sub-totals from the quantity and product totalizers is substantially the same as that used in the patents above referred to. For this reason only sufficient description of this mechanism will be given to render it understandable.

In order to allow sufficient time for the selection of a desired totalizer and the engagement of the selected totalizer with the actuating racks 288, when a total or sub-total is to be printed, and also to allow time for the tripped transfer devices to be restored, the main drive shaft 82 is given two continuous rotations on total and sub-total printing operations, instead of one, as in adding operations.

During a total or sub-total operation one of the totalizers is moved into engagement with the actuating racks 288, and each of the engaged totalizer pinions 290 controls the extent of movement of its differentially movable actuator, and hence the setting of its particular type wheel to print a total or a sub-total on the record strip. As the printing mechanism is not necessary to a clear understanding of the invention shown in this divisional application, it has been omitted.

To permit two rotations of shaft 82 in total and sub-total operations, the total lever 60 controls mechanism shown in Fig. 18, to prevent the restoration of the motor locking arm 118 (Fig. 20) to normal locking position, until near the end of the second rotation.

Slidably mounted on the stud which supports gear 84 (Fig. 18), is a link 425, one end of which is pivoted to a lever 426, loose on the stud 140. Pivoted to the lever 426 is a link 427. At its lower end the link 427 surrounds a pin 428 which extends through a slot 429, formed in an arm 430 fast on a sleeve 431 supported by the shaft 184. The link 425 has a stud 432, engaging a slot 433 in the previously described link 139. The link 425 has two pins 434, one on each side of a projection 435, of a coupling plate 436, slidably mounted in a groove 437 in a disk 438. The link 425 also has a roller 439 which normally lies in a notch 440 in the disk 438, but which is moved into a cam groove 441 in the disk 438 at certain times, as will be described later. The gear 84 has a circular recess in which the disk 438 lies.

Fast on the sleeve 431 (Fig. 15) is an arm 443, carrying a pin 444, projecting into a slot 445 in an arm 446, pivoted on a stud 447, supported by the hanger (not shown). The total lever 60 is made integral with a disk 448, loosely mounted on the stud 400, as is well known in machines of this type. The total lever is moved either upwardly or downwardly, to select the proper totalizer line in total and sub-total printing operations. The movement of the total lever, either up or down, rocks a lever 449, pivoted on stud 447 counter-clockwise, due to the engagement of a pin 450 on said lever, with a slot 451 in the total lever disk 448, and a spring 452, rocks the arm 446 counter-clockwise whereupon the arm 443 and sleeve 431 rock clockwise (Fig. 15). As the arm 430 (Fig. 18) is fast on the sleeve 431, the link 427, which is connected to the arm 430 by the pin 428, will be moved upwardly (Fig. 18), thereby rocking the lever 426 in a clockwise direction, and moving the link 425 to the left, in the direction of its length. This movement of the link 425, through the engagement of pins 434 with the coupling plate 436, moves said plate to the left, and the narrowed end thereof enters a notch in the gear 84, thus connecting said gear and disk 438.

The movement of the link 425 also rocks the link 139 clockwise about the stud 132. As the disk 438 is connected to the gear 84, the counter-clockwise movement of the gear and disk, through the roller 439, moves the link 425 still farther to the left, and rocks the link 139, so that when the release-shaft restoring lever 141 is lowered, near the end of the first half rotation of the gear 84 by the cam node 146, as before described, the stud 142 moves idly in the elongated portion of the opening 143, thus preventing the link 139 from rocking the shaft 39 and the retaining lever 118 to normal positions. As the lever 118 is not rocked to normal position, the locking lever 123 is not locked near the end of the first rotation of the shaft 82 when the pin 127 raises the link 126 to rock the arm 121 and lever 123 to normal, and therefore, the spring 128 immediately rocks the lever 123, to allow the motor clutch to drive the mechanism a second rotation.

Near the end of the complete rotation of the gear 84, the link 425 is moved to the position to which it was adjusted by the total lever, so that when the lever 141 is rocked clockwise a second time by the second cam node 146, the stud 142 engages the shoulder 454, in the opening 143, to lower the link 139, and to rock the lever 133, and the shaft 39 counter-clockwise (Fig. 18), slightly past normal position, but not as far past normal as in adding operations. Just before this movement of the shaft 39 and lever 118, which is clockwise as viewed in Fig. 20, the pin 127 rocks the lever 123 to normal, and the lever 118 when moved past normal, engages the pin 120, and locks the lever 123 to stop the motor, as in adding operations. The shaft 39 and lever 118 are then moved back to normal positions, the lever still retaining the locking lever 123 in normal locked position.

In total taking operations a selected totalizer is moved into engagement with the actuating racks 288 before said racks are moved. The differential movement of the racks is controlled by the totalizer pinions themselves. After the actuators have been moved differentially under the control of said totalizer wheels, the totalizer is disengaged from the actuators, thereby leaving the totalizer wheels at zero.

In sub-total taking operations the totalizer is engaged with the actuators and is held in engagement with said actuators to control the differential movement thereof. The totalizer is then held in engagement with the actuators while said actuators are restored to their home positions, thereby accumulating upon the totalizer the amount just previously taken therefrom.

The mechanism whereby the totalizer controls the differential movement of the actuators during total and sub-total operations, will not be described herein, as it is not essential to a thorough understanding of the present invention.

A usual means for locking the total lever on any operation after the machine is released is disclosed in Fig. 16.

It will be remembered that when the machine is released, the locking detent 108 (Fig. 16), is rocked counter-clockwise about the shaft 107. This detent carries the pin 109, which extends through a bifurcated arm 525 of a yoke 526 loose on the shaft 39.

The yoke 526 (see also Figs. 3 and 14) has a downwardly extending arm 527, carrying a pin 528, adapted to co-operate with a surface 529, of the above described arm 516, which co-operates with the notches in the total lever disk.

When the detent 108 is rocked counter-clockwise, the yoke 526 and the arm 527 are rocked in a clockwise direction about the shaft 39, thereby causing the pin 528 to bear down on the surface 529 of the arm 516, and rock this arm clockwise far enough to engage the end thereof with one of the notches 515 in the total lever disk, thereby locking this disk against any movement until the release mechanism is again returned to normal, when the pressure on the arm 516 will be released and the spring 521 will return the arm 516 to its disengaged position.

An interlock is provided between the release mechanism of the machine and the total lever 60, to prevent the release of the machine, if, through carelessness, or any other reason, the total lever is left slightly above or slightly below its adding position. In order to accomplish this function, the shaft 107 (Fig. 15), carries a lever 534 loose thereon, which has an arm 535 adapted to co-operate with the pin 110, carried by arm 111, above described.

Pivotally connected to the lever 534 is a link 536, pivoted to the upper end of the arm 446. It will be recalled that whenever the total lever is moved either up or down from its adding position, the arm 446 is rocked in a counter-clockwise direction. This movement will, through the link 536, rock the lever 534 sufficiently in a clockwise direction to bring the arm 535 below the pin 110. If, however, the total lever should be only slightly displaced from its adding position, the arm 535 of the lever 534 will stop in the path of the pin 110. The arm 111 and pin 110 are rocked in a clockwise direction to release the machine for operation, and if the arm 535 is stopped in the path of said pin, it is evident that the machine cannot be released.

If the total lever is moved into its adding position, arm 535 will be positioned above the pin 110, as shown in Fig. 15, and if the total lever is moved into any of its total taking positions the arm 535 will be moved below the pin 110, in either event permitting the operation and release of the machine.

It is desirable that only the uppermost key 56 (Fig. 12) in the release bank should be used to release the machine on total or subtotal taking operations. For this reason means is provided herein to prevent the depression of any key in the release bank, excepting key 56, when the total lever has been moved out of its adding position.

Loose on the hub 172 (Fig. 7) is an arm 537, which carries a segmental plate 538, adapted to co-operate with the release bank of keys. The plate 538 has a notch cut therein, opposite the pin 104 on each of the keys 57, 58 and 59. With the total lever in its adding position, the plate 538 is in the position shown in this figure, and therefore, there is no obstruction to the depression of any of the keys in this bank. The arm 537 carries a downwardly extending branch 539, the end of which has a pin 540 projecting through a bifurcated arm 541. The bifurcated arm 541 is loose on the shaft 184, and is connected by a yoke 542 to the arm 443 (Fig. 15).

As above described, when the total lever is moved out of its adding position, the arm 443 is rocked clockwise (Fig. 15). This movement of the arm 443, will through the yoke 542 (Fig. 7) rock the bifurcated arm 541 also clockwise about the shaft 184. This movement of the arm 541 through the pin 540 will rock the arm 537 and the segmental plate 538 counter-clockwise far enough to remove the slots in said plate from beneath the pins 104, thereby bringing solid portions of said plate 538 beneath the pins on the keys 57, 58 and 59, in order to prevent their depression.

It is apparent that the key 56 will not be affected by the movement of the plate 538, and therefore, this key may be depressed on total taking operations, to release the machine.

*Means for preventing depression of quantity and product keys, unless the total lever is correctly positioned*

In total or sub-total taking operations, the total lever 60 is moved either up or down to the position corresponding to the totalizer line to be operated.

When the total lever is moved into its second position either above or below its adding position, the product totalizer line will be selected for operation, and therefore, with the lever in this position, the keys in the product bank must be free, and those in the quantity bank should be locked. It has already been described how the movement of the total lever prevents the depression of any of the release keys except the uppermost key 56. When the total lever is moved into its third position either above or below adding position, the quantity totalizer line is selected for operation and, therefore, the keys in the quantity bank must be free and those in the product bank should be locked.

This interlocking feature between the total lever and the product and quantity keys is not a new interlock, and it is, therefore, thought that it is not necessary to further describe it in the present application. An interlock of this nature may be found in the previously mentioned Shipley Patent No. 1,619,796.

Multiplying mechanism

Various forms of mechanism for accomplishing multiplication are known in the calculating machine art. The present machine uses one of these forms. In order to perform multiplication, the multiplicand is added into a special totalizer as many times as may be required by the multiplier. This totalizer is shiftable laterally of the actuators, and is automatically positioned under control of the multiplier keys.

The totalizer starts at the left-hand side of the machine and is engaged with each denominational order as many times as there are units in the digits of the multiplier. Thus, if the multiplier is 321, the totalizer will be moved to its first position and will be held there, while the multiplicand is added once thereon. It is then shifted to its second position, and it remains there during two cycles of operations, whereupon it is moved to its third position. The totalizer remains in the third position long enough for the multiplicand to be added three times thereon.

The product has now been registered on the special totalizer. If there has been one or more decimal places in the multiplier, the product is corrected, that is, if the decimal places exceed two in the product and the amount in the third decimal place exceeds five, then an extra unit is added to the totalizer wheel in the second decimal place. The extra decimals over two are dropped and the multiplying totalizer wheels are returned to their original positions, that is, restored to zero.

The amount differential mechanism is then set under control of the multiplying totalizer wheels, and the product is transferred to the selected product totalizer or totalizers, the type wheels, and the indicator tablets, in order to properly register, record and indicate the product of the multiplying operation. The indicator and printer mechanism being fully shown and described in the parent case, Patent No. 1,786,525 issued on December 30, 1930.

Multiplier keys

The engaging and shifting movements of the special multiplying totalizer are, to a large extent controlled by the five banks of multiplier keys, (Fig. 23) and a description of these keys and their corresponding differential mechanisms will now be given.

Most of the mechanism for accomplishing multiplication is located on the right-hand side of the machine between two frames, only one of which, 585, is shown. There are five banks of multiplier keys 62, these being the five banks on the extreme right-hand end of the keyboard. There are ten keys in each of these banks, the keys being numbered from 0 to 9, both inclusive. As these banks of keys are duplicates of each other, a description of one of the banks will be sufficient for all.

These keys 62 are slidably mounted in a key frame 587, which is very similar to the key frame 31, described in connection with the amount keys. These key frames are supported at their upper ends on a rod 588, and at their lower ends on a rod 589, extending between the side frames of the multiplier mechanism. Each of the keys 62 carries a laterally projecting pin 616, which is adapted to cooperate with a hook 617, formed on a detent bar 618, carried by an arm 619, loosely mounted on a cross rod 620, supported by the multiplier frames.

A spring 621 is connected to the lower end of the detent bar 618, and normally tends to rock the arm 619 counter-clockwise. When one of the multiplier keys 62 is depressed, its pin 616 cooperates with the hook 617, of the detent bar 618, and moves the bar upwardly until the pin passes the hook, whereupon the bar 618 will be lowered by the spring 621, and hold the depressed key in its depressed position. These keys are of the so-called flexible type, whereby the depression of any key in the same bank will release a previously depressed key. It is apparent that the depression of a second key will cause its pin to engage the hook 617 appropriate thereto, moving the detent bar 618 upwardly, which movement will release the key previously depressed, and latch the key last depressed.

At the proper point in the multiplying operation of the machine the shaft 39 is rocked counter-clockwise, as viewed in Fig. 23, and then clockwise to normal position. On its counter-clockwise movement, arms 622 fast on this shaft, and which carry a rod 623, will be rocked likewise. The rod 623 will come into contact with a surface 624, of a hook 625, formed at the upper end of the detent bar 618, and move said bar upwardly a sufficient distance to unlatch the pin on whichever one of the keys has been depressed, and permit this key to return to its undepressed position.

Multiplier differential mechanism

The differential mechanism which cooperates with each of the banks of multiplying keys, is of the general type shown and described in the above mentioned Shipley Patent No. 1,619,796.

The differential mechanism includes a plurality of differential drivers 630 (Fig. 23). There is one of the drivers 630 for each bank of multiplying keys, and all of these drivers are fast on the shaft 620. Also fast on this shaft is a segment gear 631, which meshes with the teeth of a segment gear 632, carried by an arm 633, loosely mounted on a shaft 634, supported by the multiplier side frames. The arm 633 carries a roller 635, which co-operates with a cam 636, loose on the main drive shaft 82. The arm 633 (Fig. 22) also has a projection 637, which carries a roller 638, which in turn co-operates with a cam 639, also loose on the drive shaft 82.

The cams 636 and 639 are rotated once in a clockwise direction during the first and last regular cycles of operation of the machine, as will be later described, and due to the conformation of the cams 636 and 639 (Fig. 22), the arm 633 and the segment gear 632 will be rocked first counter-clockwise and then clockwise to their normal positions during each of these cycles.

As the segment gear 631 meshes with the segment gear 632, this gear and all of the differential drivers 630 will be given first a clockwise and then a counter-clockwise movement to their normal positions during the first and last regular cycles of operation.

Also loosely mounted on the shaft 620 are five differentially movable arms 645 (Fig. 23), one of said arms being appropriate to each bank of the multiplier keys. Pivoted to each of the differentially movable arms 645, is a bell crank lever 646. The upwardly extending arm of this bell crank lever has a notch 647, which co-operates with a nose 648 on its appropriate driver 630. A spring 649 is stretched between an upwardly extending portion of the differentially movable arm 645 and a pin in the forwardly extending arm of the bell crank lever 646, thereby normally holding the notch 647 in engagement with the nose 648, of the driver 630. The bell crank lever 646 lies in the same vertical plane as the keys of its appropriate bank.

When the driver 630 moves in its clockwise direction, it is evident that the differentially movable arm 645 will be carried therewith until the forwardly projecting arm of the bell crank lever 646 or latch strikes the inner end of whichever one of the keys, in its appropriate bank, has been depressed, whereupon the bell crank lever will be rocked in a counter-clockwise direction far enough to disengage the notch 647 from the nose 648 of the driver 630. When this occurs, a projection 650 of the bell crank lever 646 will enter one of a plurality of notches 651, formed in a plate 652, which is secured to the frame 587, thereby locking the differentially movable arm 645 in its adjusted position. When the latch 646 is thus disconnected from the driver 630, the movement of the driver 630 will continue in a clockwise direction to the end of its stroke. The surface 653, of the latch 646 will co-operate with the arc of the driver, thereby holding the latch in its moved position during the remainder of the clockwise movement of the driver 630, and also during the counter-clockwise movement thereof, until the upper end of the driver passes below the end of the surface 653, whereupon the spring 649 will rock the latch 646 to disengage the projection 650 from its notch 651, and reengage notch 647 with the nose 648, of the driver. When this reengagement takes place the differentially movable arm 645 will be picked up by a pin 644 projecting from the driver 630 and returned to its zero position with said segment.

Pivoted to each of the differentially movable arms 645 is a beam 654, which answers the same purpose exactly as the beams 310, previously described in connection with the differential mechanism of the amount banks and which is a well known feature in machines of this type.

At its lower end (Fig. 23) the beam 654 of each bank is bifurcated and surrounds a pin 655, carried by a link 656, pivoted at its right-hand end to a lever 657, loose on a shaft 658, supported by the multiplier side frames. At its left-hand end the link 656 is pivoted to a spiral segment 659, loose on a shaft 660. This shaft 660 is also supported by the multiplier side frames. The spiral segment 659 sets up printing mechanism not shown herein.

After the differentially movable arm 645 has been positioned under control of the keys 62, it is necessary to adjust each of the beams 654, in order to differentially position the links 656 and the mechanism connected thereto. This is accomplished by a plurality of beam actuators 664, which are fast on the shaft 660, and which carry rollers 665, adapted to co-operate with the forward lower surfaces of the beams 654.

The beam actuators 664 are rocked clockwise (Fig. 23) and then counter-clockwise to their normal positions. On their clockwise movement the rollers will come into contact with the beams 654, and will cause the beams to be differentially positioned in accordance with the positioning of the differentially movable arms 645.

A single means is provided for rocking all of the beam actuators 664 clockwise and then counter-clockwise to their normal positions, for the purpose of adjusting the beams 654, as above described. Near its right-hand end shaft 660 carries a segment gear 643 fast thereon, which co-operates with a segment 666 of a lever 667 loose on a shaft 668, supported by the side frames of the multiplier. The lever 667 has two arms 669 and 670, which carry rollers 671 and 672 respectively, cooperating with a pair of cams 673 and 674, loose on the shaft 82. These cams are driven with the cams 636 and 639 and are given one complete clockwise rotation on the first and last regular cycles of operation of the machine, and the cams 673 and 674 are so formed that the segment 666 will be rocked first counter-clockwise and then clockwise, thereby rocking the segment gear 643 and shaft 660 first clockwise and then counter-clockwise, to their normal positions.

The movement of the shaft 660 first clockwise and then counter-clockwise will cause all of the beam actuators 664 to be given a like movement, as they are fast on this shaft.

*Means for maintaining machine in reelased position during a plurality of cycles of operation*

As has been previously stated, every complete multiplying operation consists of four regular cycles of the drive shaft 82, plus the number of cycles necessary to perform the multiplication controlled by the depressed multiplier keys. The first regular cycle occurs before the multiplying cycles, but the second, third and fourth regular cycles occur after the multiplying cycles have been completed. It, therefore, becomes necessary to maintain the machine in a "released" condition during a plurality of cycles of operation. In other words, the release shaft 39 must be so controlled as to permit the motor locking lever 123 (Fig. 20) to rock counter-clockwise under the influence of its spring 128. To permit such movement of the lever 123, the retaining lever 118 must be removed from contact with the stud 120.

During the first regular cycle, the coupler 136 (Fig. 18) is shifted, by mechanism to be later described, to uncouple the release shaft from its restoring mechanism, so that the release shaft restoring lever 141 will have no effect upon the release shaft, and consequently, the shaft 39 will not be restored near the end of the first cycle.

This uncoupled condition between the release shaft 39 and the restoring lever is maintained during all of the several multiplying cycles except the last multiplying cycle, during which cycle the coupler 136 is shifted by the mechanism to be later described, to couple the release shaft with its restoring mechanism, whereupon the release shaft is operated by the restoring lever 141 to release all depressed amount or multiplicand keys 30, check number keys 61, and multiplier keys 62, but any depressed quantity key 45, product key 55, or release key 58 or 59, shall not be released during the last multiplying cycle. These latter keys 45, 55, 58 and 59 must remain in their depressed positions until the fourth or last regular cycle, which occurs after the multiplying cycles have been completed.

Since one of the release keys 58 or 59 is maintained in its depressed position until the last regular cycle, it is apparent that the release shaft 39 will be released at the beginning of the second regular cycle which occurs immediately following the last multiplying cycle.

It will be recalled, that when the machine is released by the depression of one of the release keys, the arm 106 and locking detent 108 (Fig. 11) are rocked counter-clockwise, and the stud 110 moves between the detent 108 and the non-repeat detent 116. Now, since the function of the non-repeat detent is to prevent the machine from being released by the holding in of a release key at the end of the operation, it becomes necessary to render this non-repeat detent 116 ineffective during the second regular cycle of a multiplying operation, so that the pin 110, after it has been restored to the position shown in Figs 14 and 15 during the last multiplying cycle, may on the subsequent cycle, which is the second regular cycle of operation, again move between the locking detent and non-repeat detent 116.

To provide for the peculiar release conditions of the machine above noted, a release shaft controller 700 (Figs. 11 and 12) is slidably mounted on a stud 701 carried by a projection 702 of the release bank supporting frame or hanger, and a collar on the shaft 320, the controller being provided with a slot 703 to surround said collar. Secured to the shaft 320 is a cam 705 cooperating with rollers 706 and 707 on the controller 700 to slide the controller to and fro to control the release shaft 39 and release of the quantity, product and release keys, as above stated.

The means for rocking the shaft 320 to operate the cam 705, will be described below, it being sufficient at this point to state, that the controller 700 is moved in the direction of its length toward the left during the first regular cycle to move an arm 704 and a shoulder 699 into contact with the pin 109 on the locking detent 108, and a pin 99 on the non-repeat detent 116, respectively. The controller 700 is maintained in such position during all of the multiplying cycles, during the second and third regular cycles of the machine, and is restored to its normal position during the last regular cycle, consequently, the locking detent 108 and non-repeat detent 116 will be held apart so that the pin 110 may, at the beginning of the second regular cycle, which occurs immediately following the last multiplying cycle, again move between the locking and non-repeat detents to maintain the machine in its released condition. The holding up of the locking detent 108, through the arm 106, yoke 65, and arms 166, maintains the detent 100 (Fig. 12) for the release bank, and the locking detents 155 (Fig. 5) for the product and quantity banks in their moved positions, thus retaining the depressed keys in these banks in such depressed positions during all of the multiplying cycles, the second and third regular cycles, and the fourth cycle until near the end thereof, whereupon the controller 700 is restored to its normal position, thus permitting the detents 108 and 116 to assume their normal functions, and permitting the restoring lever 141 to operate the release shaft 39 to restore it, and consequently, the quantity, product and release keys to their normal positions.

The mechanism for rocking the shaft 320, as above noted, will now be described. Fast on the shaft 320 is an arm 708 (Fig. 6), to which is pivoted the lower end of a pitman 709 slotted near its upper end to surround the shaft 710. This shaft will be known herein as the upper control shaft. Pitman 709 carries rollers 711 and 712, adapted to cooperate with cams 713 and 714, respectively, fastened on the shaft 710. The upper control shaft 710 is given one complete rotation in a counter-clockwise direction during a complete multiplying operation. The first 90 degrees of its rotation occurs during the first regular cycle of operation. It is then idle during the required number of multiplying cycles, and finally receives the remainder of its rotation during the last three regular cycles of operation.

It can be seen from Fig. 6 that the pitman 709 is moved downwardly, just at the end of the first one-quarter rotation of the cams 713 and 714. It then remains in its downward position throughout the multiplying cycles, during which time the shaft 710 is not moved. After the multiplying cycles have been completed, the shaft 710 is given the remaining three-quarters of its rotation, and just at the end of the last quarter the pitman 709 will be moved upwardly to its normal position, thereby rocking the arm 708 and shaft 320 clockwise to their normal positions. During the second and third quarter rotations the cams move the pitman for a purpose later set forth. This movement has no effect on the control of the pitman over the operating means for the release shaft 39.

*Key-release disabling mechanism*

It will be recalled that at the end of each cycle of operation of the machine, the cam node 146, of the cam groove 145 (Fig. 18), will act on the release-shaft restoring lever 141, and will lower the link 139, and thereby rock the lever 133 counter-clockwise, for the purpose of rocking the release shaft 39 to release the depressed keys. It is, therefore, necessary in multiplying operations, to provide for disconnecting shaft 39 from the lever 133 and the link 139, during all except two operations, when it is necessary to release certain of the keys. It is desirable to have the amount or multiplicand keys remain in their depressed positions until the end of the last multiplying cycle. Both the multiplicand and multiplier keys are released at this point by the rocking of the shaft 39. The shaft does not, however, rock far enough to release the control keys which must remain depressed until the last regular cycle of operation of the machine.

The means which prevents the release of the multiplicand and multiplier keys until near the end of the last multiplying cycle, or in other words the means which disables the shaft 39 during the operation up to this point, will now be described.

As previously described, the lever 133 has a bifurcated portion through which projects the pin 135, carried by the coupler 136 (Fig. 18), pivoted to an arm 137, fast on the shaft 39. It is apparent that all that is necessary to disconnect the shaft 39 from the restoring mechanism is to rock the coupler 136 a sufficient distance to remove the pin 135 from the bifurcated portion of the lever 133, which is loose on the shaft 39, and can then rock idly with the link 139. The coupler 136 (Figs. 31, 32, 33, 34 and 35) carries a pin 810, projecting through a cam slot 811, formed in a cam plate 812, loose on the shaft 39. This plate 812 has pivoted thereto the left-hand end of a pitman 813, which at its opposite end is bifurcated and is adapted to slide over a pin 814, carried in the upper end of a lever 815, loose on a shaft 783, to be later described. Also pivoted on the pin 814 is a pitman operating lever 816, which has a cam slot 817 formed therein, through which a roller 818, carried by the pitman 813, projects.

Pivoted to the lever 816 is a downwardly extending link 819, which at its lower end, is pivoted to one arm of a lever 820, loose on the shaft 783. An upwardly extending portion of the lever 820 carries a pin 821, projecting through an opening formed in an arm 822, which is also loose on the shaft 783.

Figure 31:
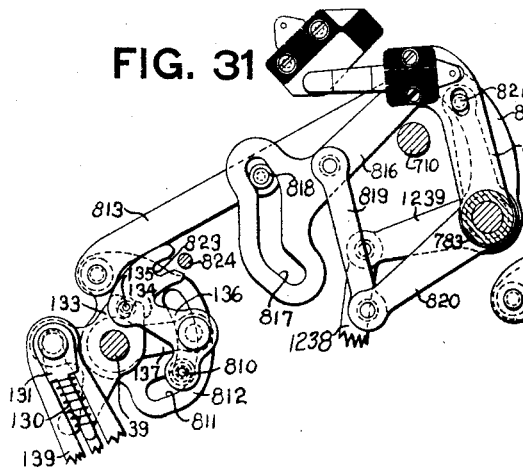
Figs. 31, 32 and 33 are detail side views of the special key release-disabling mechanism, in different positions, Figs. 31 and 32 showing the switch which automatically cuts down the current supplied to the motor during multiplying cycles.

During the first regular cycle of operation of the machine for multiplying, the arm 822 is rocked clockwise from the position shown in Fig. 31 to that shown in Fig. 32 by mechanism shown in Figs. 25A and 25B, later described, whereupon the pin 821 and lever 820 will raise the link 819 and rock the pitman operating lever 816 clockwise about its pivot 814, and the cam slot 817, through the roller 818, will move the pitman 813 to the left and rock the cam plate 812 a sufficient distance to bring the pin 810, carried by the coupler 136, into the cam portion of the slot 811, thereby rocking coupler 136 clockwise, and disengaging the pin 135 from the bifurcated portion of the lever 133.

When the coupler 136 is rocked clockwise by the cam groove 811, to disconnect the pin 135 from the bifurcated arm 134 of the lever 133, a slot 823 formed in said coupler 136 will engage with a pin 824, projecting from the side frame of the multiplying device, and hold the coupler 136 aligned in its moved position.

Figure 32:
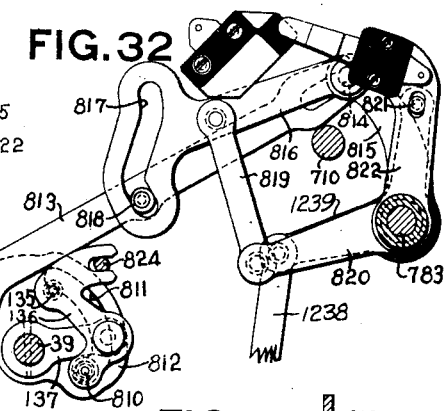

The parts above described remain in their moved positions, as shown in Fig. 32, until the last multiplying cycle of operation. During the last multiplying cycle, the arm 822 is rocked counter-clockwise, and through the pin 821 and lever 820 the link 819 is pulled downwardly, which rocks the pitman operating lever 816 counter-clockwise and moves the pitman 813 under control of the lever 816, to the right, whereupon the pitman will rock the cam plate 812 clockwise far enough to rock the coupler 136 counter-clockwise, and engage the pin 135 thereof once more with the bifurcated arm 134, of the lever 133. This engagement of the coupler pin 135 with the lever occurs just before the link 139 is moved downwardly by the release shaft restoring lever 141.

As the pin 135 is now in the bifurcated arm of the lever 133, the coupler 136, arm 137, and shaft 39, will be rocked counter-clockwise by the restoring lever 141 (Fig. 18), which will, through the mechanism above described, cause the multiplicand or amount keys, and the multiplier keys, to be released, so that they will return to their outer undepressed positions during the last multiplying cycle.

The keys in the quantity, product and release banks, which have been depressed, will not be released at this point in the operation because of the fact that the cam 705 (Fig. 11) has moved the release shaft controller 700 to the left, thereby holding the arm 106 in its moved position, and holding the detent 100 in the release bank, and the corresponding locking detents in the quantity and product banks in their moved positions through the sleeve 165 and arms 166 (see Fig. 3).

It is necessary that the release shaft be again disabled before the end of the second regular cycle of operation, and a different mechanism is provided to accomplish this function at this time, as the mechanism formerly used may not now be operated for this purpose.

Figure 17:
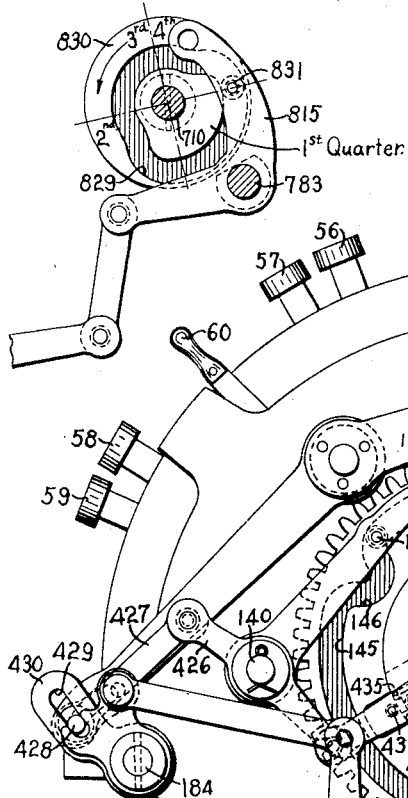
Fig. 17 is a detail side elevation of a part of the key release disabling mechanism.
Figure 33:
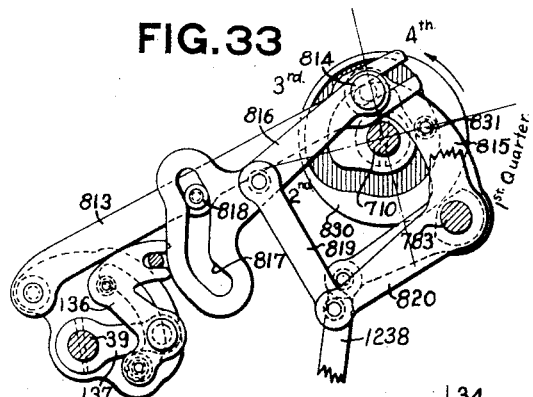
Figure 34:
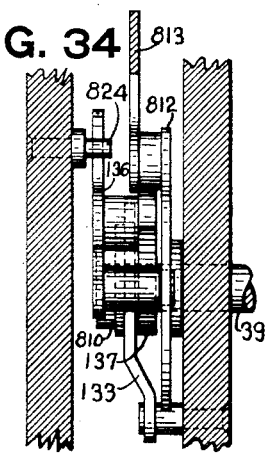
Fig. 34 is a detail sectional view taken on line 34—34 of Fig. 35, looking in the direction of the arrows, and shows an end elevation of a part of the special key release disabling mechanism.
Figure 35:
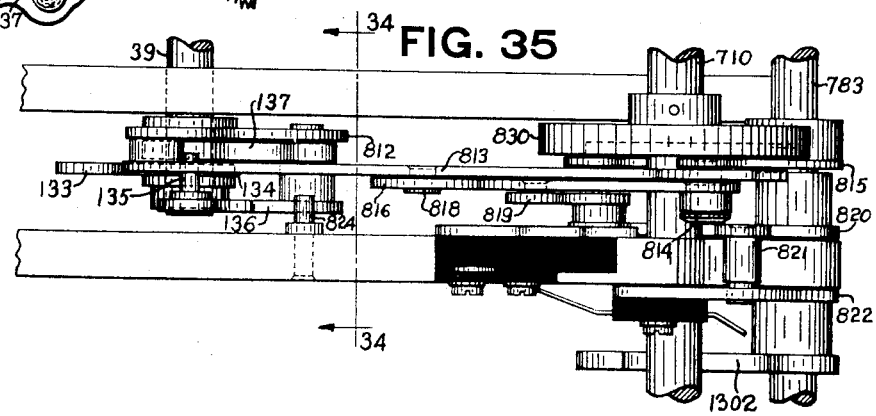
Fig. 35 is a top plan view of the special key release disabling mechanism.

The mechanism for operating the special disabling means for shaft 39 during the last three cycles of a multiplying operation of the machine, is best shown in Figs. 17, 18 and 33. Fast on the upper control shaft 710 is a cam 830 having a cam groove 829 cut therein, with which a roller 831 carried by the lever 815, loose on the shaft 783 cooperates. At its upper end the lever 815 carries the pin 814 which normally lies in the left-hand end of the bifurcated portion of the pitman 813.

It will be remembered that the shaft 710 is the upper control shaft, which receives a one-quarter rotation during each regular cycle of operation of the machine, exclusive of the multiplying cycles. It can be seen from Fig. 17 that the cam groove 829 in the cam 830 is so formed that there will be no movement of the lever 815, during the first one-quarter rotation of the cam. During the second quarter of the rotation, however, the lever 815 will be rocked counter-clockwise, which through the pin 814, pitman operating lever 816 and roller 818 will move the pitman 813 to the left, thereby disabling the shaft 39 in the manner before described. This disabled condition will continue during the third quarter movement and the parts will be returned to their normal positions at the end of the fourth quarter, which is the end of the complete multiplying operation of the machine. The parts will be rendered effective to rock the release shaft 39 on the last quarter of the operation of the cam 830 for the purpose of releasing the keys in the quantity, product, and release banks.

*Latch control mechanism for quantity and product banks*

Various means are provided for controlling the disconnecting of the differential latch in the quantity and product banks under various conditions in the operation of the machine. Since the latch control mechanism for the quantity and product banks has been illustrated, described and claimed in the parent case, Patent No. 1,786,525, and as it is not necessary to an understanding of the various interlocking features claimed in the present application, it will not be described herein, and reference may be had to the parent case if that information is desired.

*Product keys 1, 2 and 9 of quantity bank*

These product keys in the quantity bank, as has been clearly described in the parent case above mentioned, exercise a novel control over the quantity bank differential latch during multiplying operations, but as this peculiar control of the latch device has no particular bearing on the present invention, it is not deemed necessary to illustrate or describe that control herein.

*Drive for upper and lower control shafts*

The mechanism for driving the lower control shaft will be described first, as the upper control shaft is driven from the lower. Fast on the main drive shaft 82 are cams 835 and 836 (Figs. 25 and 27), which are adapted to cooperate with rollers 837 and 838 respectively, carried by a lever 839, loose on the shaft 634, but secured to an arm 840, which has a U-shaped notch in its outer end, adapted to cooperate with a pin 841 carried by a link 842. In the positions of the parts shown in Fig. 27, the pin 841 also cooperates with notches 828 formed in a U-shaped arm 843 pinned to a disk 844, which carries four pinions 845 (Figs. 27 and 28). All four of these pinions mesh with teeth 846 formed on the interior periphery of a ring 847 secured to a disk 825, the hub 826 of which is loose on a sleeve 848. Each of the four pinions 845 also meshes with a gear 849, fast on the sleeve 848. An aligning disk 850 is pinned to the ring carrying disk 825, and a similar aligning disk 851 together with the sleeve 848 is pinned to the shaft 634 which is the lower control shaft mentioned.

The cams 835 and 836 are given a complete clockwise rotation during each cycle of operation of the machine, and will rock the lever 839 and arm 840 first clockwise and then counter-clockwise, and the pin 841 will impart such movement to the arm 843, and as the arm 843 is pinned to the disk 844, which carries the four pinions 845, this disk and the pinions will move first clockwise and then counter-clockwise, as seen in Fig. 28.

Means is provided for holding either the ring 847 or the shaft 634 during a portion of an operation, so that one or the other of these elements will be driven, through the pinions 845. In other words, it is evident that if during the clockwise movement of the disk 844, the gear 849 is held against movement, the pinions 845 will roll over the teeth of the gear and drive the ring 847. On the other hand, if during the reverse movement of the disk 844 and the pinions 845, the ring 847 is held against movement, it is evident that the pinions will drive the gear 849 and the shaft 634.

The parts are so proportioned that the movement imparted to the shaft 634 during the counter-clockwise movement of the disk 844 is just 90 degrees, or one-quarter of its full rotation. This shaft is given such movement during each of the regular cycles of the machine, but not during the multiplying cycles.

The means for holding, first the gear 849 and then the ring 847, in order to properly drive the control shaft 634, will now be described. The aligning disks 850 and 851 (Figs. 29 and 30) have a plurality of notches cut in their periphery, which are adapted to cooperate with pins 856 and 857 carried by a retaining lever 858, loose on a shaft 883, supported by the side frame. The lever 858 has an upwardly extending arm 859, in which a slot 860 is formed. An operating lever 861 is loosely mounted on the shaft 883, and has at its upper end a slot 862, a portion of which coincides with the upper end of the slot 860. A pin 863, on a link 864, extends through the slots 860 and 862 and connects the operating lever 861 with the retaining lever 858.

Pivoted to the lower end of the operating lever 861 is a pitman 865 (Fig. 29), which at its left-hand end is bifurcated to slide on the shaft 82. The pitman 865 carries a roller 866, which cooperates with a cam groove 867, formed in a cam disk 868, fast on the shaft 82. The disk 868 is given one complete clockwise rotation during each cycle of operation of the machine, and the cam groove 867 is so formed that the pitman 865 will be moved first toward the left, where it will remain for approximately one-half of the rotation of disk 868, and then toward the right, to its normal position.

When the pitman 865 moves to the left, it will rock the lever 861 clockwise about the shaft 883, which movement through the connecting pin 863 will also rock the retaining lever 858 to a like extent. In the normal positions of the parts, as shown in Fig. 29, the pin 856 is in engagement with one of the notches in the aligning disk 851, which is fast to the gear 849 and shaft 634. Therefore, when the disk 844 carrying the pinions 845 is rocked clockwise, the gear 849 will be held and the ring 847 will be rotated. When, however, the U-shaped arm 843 has received its full clockwise movement, the pitman 865 is moved toward the left, thereby rocking the operating lever 861 and retaining lever 858 clockwise about the shaft 883 to remove the pin 856 from the notch in the aligning disk 851, and engage the pin 857 with one of the notches in the aligning disk 850 secured to the ring 847 to hold the ring against movement. During the counter-clockwise return movement of the U-shaped arm 843 (Fig. 25), the pinion 845 will drive the lower control shaft 634 and the gear 849 in a counter-clockwise direction to an extent equal to 90 degrees of its entire movement.

Figure 13:
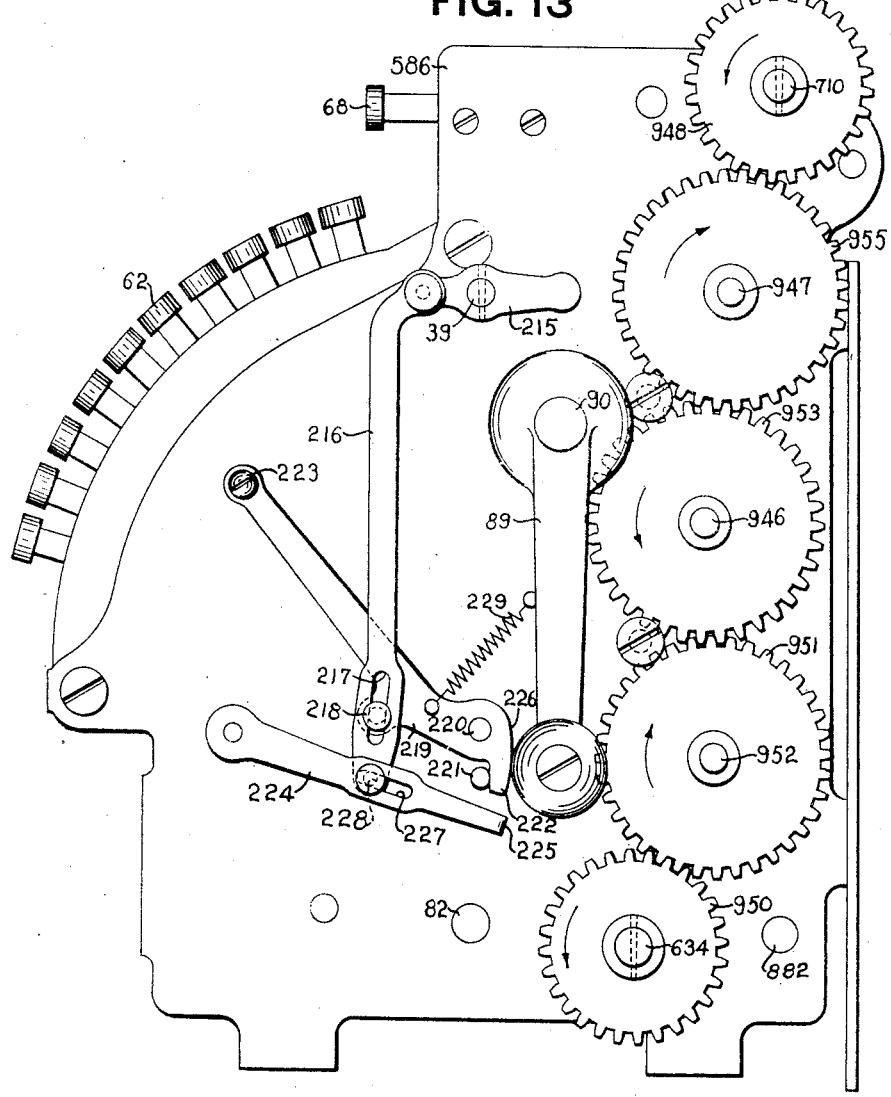
Fig. 13 is an elevation of the right-hand end of the machine showing the multiplier keys, the decimal placing keys, the manual release and crank handle, and also the interlock between the key release lever and the release shaft.

The means whereby the upper control shaft 710 is driven from the lower control shaft 634 includes the train of gears illustrated in Fig. 13. Secured to the right-hand end of the lower control shaft 634 is a gear 950 meshing with the lowermost gear of a train consisting of intermediate gears 951, 953 and 955 mounted on studs 952, 946 and 947, respectively, carried by the side frame 586. The uppermost gear 955 of the train meshes with a gear 948 secured to the upper control shaft 710. As the three intermediate gears are of the same pitch diameter, and as the gears 950 and 948 on the shafts 634 and 710 respectively, are alike, the upper control shaft 710 will be driven at the same time and the same distances as the lower control shaft 634.

*Disabling control shaft drive on adding operations*

The mechanism for disabling the drive for the control shafts on adding operations is shown in Figs. 12 and 29. It will be remembered that the link 312, shown in these figures, is differentially positioned, by the differential mechanism of the release bank. This link through arm 795 actuates the aligning segment 794. In both Figs. 12 and 29, the parts are shown in the positions that they assume on a multiplying operation. On such an operation either key 58 or key 59 is depressed, and therefore, the differential latch mechanism is disconnected from its driver in such a position that the aligner tooth 792 will enter either of the two lower notches 793 in the segment 794.

If on the other hand an adding operation is to take place, either the key 56 or the key 57 will be depressed. This will cause the differential mechanism to set the segment 794 in such a position that either of the two upper notches in the segment 794 will be opposite the aligning tooth 792. The segment 794 carries teeth 869, meshing with a segment gear 870, pinned on the shaft 783. Also fast on this shaft is an arm 871, to which is pivoted the upper end of the link 864. It can be seen from Fig. 29 that when an adding operation takes place and the segment 794 is rocked clockwise far enough to bring the upper two notches therein into cooperative relation with the aligner tooth 792, the teeth on this segment 869 will rock the segment gear 870, the shaft 783 and the arm 871 counter-clockwise, and lower the link 864 far enough to bring the connecting pin 863 carried thereby into the lower portion of the slot 860 (Fig. 30), in the retaining lever 858. The slot 862, in the operating lever 861 has an enlarged portion 872 at its lower end, which will be opposite the pin 863 after the link 864 has been lowered on adding operations.

It is evident that in this position of the parts, the retaining lever 858 is disconnected from the operating lever 861, and even though the cam 868 will drive the pitman 865 backward and forward as in multiplying operations, the movement of the pitman 865 and the lever 861 will have no effect on the retaining lever 858, and therefore, it will remain in the position shown in Fig. 29, in which it locks the gear 849 and the shaft 634 against movement. When the link 864 is in its lower position, its lower projecting end bears against the lowest shaft 933 (later described) to lock the lever 858 against accidental movement. A powerful spring 853 (Fig. 25) is connected to the arm 843 to insure that this arm returns all the way to its normal position shown in this figure.

If the next operation is a multiplying operation, the segment 794 will move into the position shown in Fig. 29, which movement will rock the segment gear 870, shaft 783 and arm 871, all clockwise and raise the link to the position shown in Fig. 29, in which it engages the narrow part of the slot 862, and thereby connects the operating lever 861 and the retaining lever 858 so that the shaft 634 may be unlocked during the four regular cycles of multiplying operations to perform its functions.

*Means for disabling control shaft drive during multiplying cycles*

In order that the machine may operate properly, it is necessary to disable the control shaft drive during the multiplying cycles of operation, and then to render the driving mechanism for the control shafts effective again for the last three regular cycles of operation. It can be seen from Fig. 27 that the pin 841 normally connects the arm 840 with the U-shaped arm 843, for the purpose of driving the lower control shaft, as has been previously explained.

Toward the end of the first regular cycle of operation, during which the control shaft is driven, the pin 841 is moved out of the notch in the end of the arm 840, and positioned in a notch 880 (Figs. 25 and 27), formed in keeper 881, supported by a shaft 882 and a rod 883, mounted in the side frames of the multiplier device. When this occurs, the arm 840 will be rocked idly by the lever 839 and the cams 835 and 836. The pin 841 will remain disengaged from the notch in the arm 840 until just at the end of the last multiplying cycle, at which point in the operation the pin will be returned to the position shown in Fig. 25, and therefore, on the three regular cycles which follow the multiplying cycles, the control shaft will receive the remaining three quarters of its movement.

The means for moving the pin 841 from the position shown in Fig. 25 into the notch 880 of the keeper 881, will now be described. The link 842, carrying the pin 841, is pivoted to the lower end of a bell crank lever 884, loosely mounted on the shaft 90, above described. The other arm of the bell crank lever 884 extends toward the rear of the machine and has a cam slot 885 formed therein, through which projects a pin 886, carried by an arm 887, loose on a shaft 888, supported by the multiplier side frames.

Figure 25:
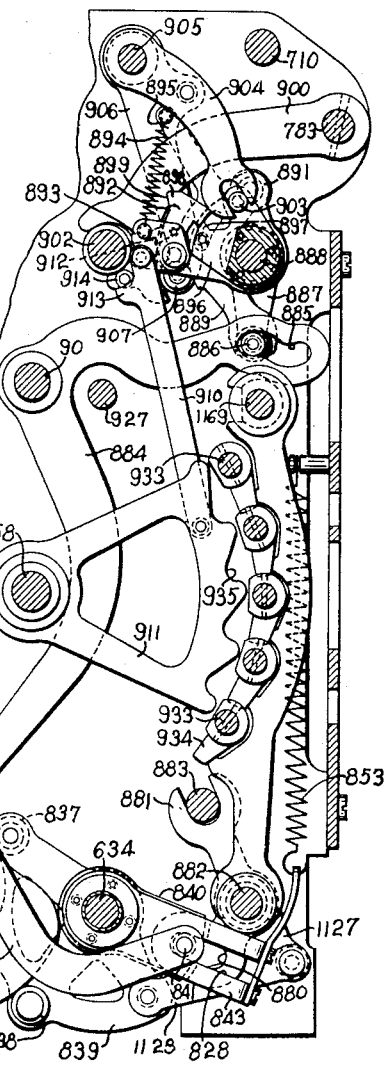
Fig. 25 is a section through the multiplying mechanism showing particularly the governor control.
Figure 25:
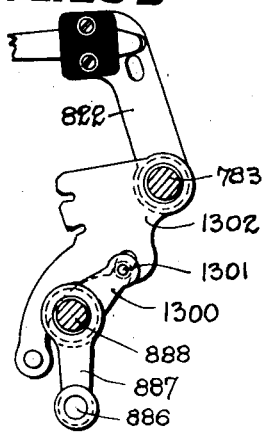
Figure 25:
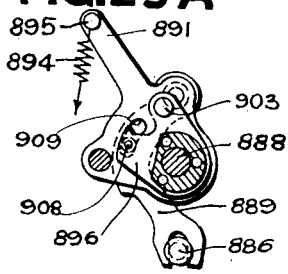

Cooperating with the pin 886 is the bifurcated end of a beam 889, adapted to be set by a differential mechanism shown in Fig. 25. The beam 889 is pivoted to a differentially movable arm 891 (see also Fig. 25A), loose on the shaft 888. The differentially movable arm 891 known hereinafter as the governor differential, has pivoted thereto a latch 892, to which is pinned a plate 893. The latch 892 constantly tends to rock in a clockwise direction (Fig. 25), due to a spring 894, stretched between a pin on the plate 893 and an upwardly extending finger 895, of the differentially movable arm 891.

Also loose on the shaft 888 is a driver 896 which has a nose 897 adapted to cooperate with a notch formed in the latch 892. In its normal position the projection 898 of said latch engages with an upper notch 899, formed in detent bar 900, supported at its upper end on the shaft 783, and at its lower end by a shaft 902, mounted in the multiplier side frames.

The driver 896 carries a pin 903, which extends through a bifurcated portion of an arm 904, loose on a shaft 905, but hubbed to a beam actuator 906, which at its lower end carries a roller 907, adapted to cooperate with the beam 889. During every cycle of the machine, the driver 896 is rocked counter-clockwise and then clockwise to its normal position by means which will be later described.

On its counter-clockwise movement during the first regular cycle, the driver 896 will pick up the differentially movable arm 891 by means of a pin 908 (Fig. 25A), carried by said driver and entered in a slot 909 formed in said differentially movable arm. As the driver 896 moves downwardly, the latch 892 will rock clockwise as soon as the nose 897 passes the end of the latch foot, and the differentially movable arm and the latch will be carried downwardly with the driver.

Pivoted to the plate 893 is a downwardly extending link 910, which at its lower end is pivoted to a segment 911 (Fig. 25), loosely mounted on the shaft 658. There is one segment 911 for each bank of multiplier keys 62. If any one multiplier key has been depressed, the segment 911 which has been rocked clockwise, due to its connection with the latch 892 above mentioned, will be held in its lower position by means which will be hereinafter described. It can, therefore, be seen that if the segment 911 is held, the latch 892 will be rocked counter-clockwise until the projection 898 thereof, engages in the notch 912 formed in the detent bar 900.

This rocking of the latch 892, of course, takes place during the clockwise movement of the driver 896, and therefore, the latch 892 and the differentially movable arm 891 will be disconnected from the driver 896 when these parts are in their lower positions. Then, as the upward movement of the driver continues, the arm 904 and beam actuator 906 will be rocked counter-clockwise about the shaft 905, which will bring the roller 907 into engagement with the left-hand side of the beam 889, to position the beam in accordance with the position of the differentially movable arm.

This movement of the beam 889 (Fig. 25) will move the pin 886, carried by the arm 887 counter-clockwise about the shaft 888 and, through the cam slot 885, rock the bell crank lever 884 counter-clockwise about the shaft 90, and move the link 842 to slide the pin 841 from the position shown in Fig. 25 into the notch 880 of the keeper 881, thereby disconnecting the control shaft driving mechanism from its driving arm 840.

The movement just above described takes place during the first regular cycle of operation of the machine. After this cycle come the multiplying cycles, varying in number in accordance with the value of the multiplier. Segment 911 is held in its lower position during all of the multiplying cycles, and therefore, even though the driver 896 rocks counter-clockwise and then clockwise during each of said multiplying cycles, it will have no effect on the control shaft disabling mechanism so long as the segment 911 is held in its lower position, as the latch 892 will disconnect the driver in its lower position on every operation, and the position of the beam 889 will not be changed, and the pin 886 will remain in the moved position, that is, the pin 886 will remain in the right-hand end of the slot 885 in bell crank 884 instead of the left-hand end as seen in Fig. 25. On the last multiplying cycle, however, the segment 911 is free to move upwardly. On the downward movement of the driver 896, it will be latched with the differentially movable arm 891, and upon the upward movement of the driver, will carry the differentially movable arm and the latch with it, to the upper position of the latch. When the differentially movable arm reaches its upper position, the latch will be disconnected, that is, rocked counter-clockwise by the engagement of a shoulder 913, formed on the link 910, with a pin 914, carried by the lower end of the bar 900, and the projection 898 will engage the upper notch 899 in the bar 900.

The beam 889 will, of course, be moved to the position shown in Fig. 25, due to the movement of the differentially movable arm 891, and therefore, the pin 886 will be returned to the left-hand end of the cam slot 885 in the bell crank lever 884 and rock the bell crank lever clockwise, whereupon the link 842 will reengage the pin 841 with the notch in the arm 840, to render the control shaft driving mechanism effective. During the remainder of the operation, the latch 892 will be disconnected in its upper position, and therefore, the control shaft driving mechanism will be effective during the second, third and fourth cycles of the operation.

Figure 24:
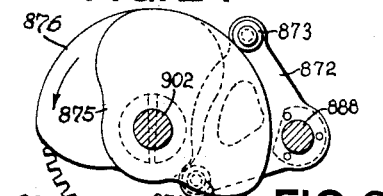
Fig. 24 is a detail view of the cam and mechanism for actuating the control shaft governor.

The mechanism for driving the governor differential is shown in Fig. 24. The driver 896 is hubbed to a lever 872 which has two rollers 873 and 874 cooperating with cams 875 and 876 respectively, fast on the shaft 902. These cams will rock lever 872 and the driver 896 first counter-clockwise and then clockwise on every cycle of operation.

The shaft 902 is given one complete counter-clockwise rotation during each cycle of operation of the machine by a gear 915 secured to the shaft 90 and another gear 916 secured to the shaft 902.

*Drive for key-disabling mechanism during the first regular cycle of operation*

As hereinbefore mentioned, the arm 822

(Fig. 32), is rocked clockwise, during the first regular cycle of operation to disable the key releasing mechanism, but the means for rocking the arm 822 was not described at that time. This means includes an arm 1302 (Figs. 25A and 35) hubbed to the arm 822. The arm 1302 is bifurcated to receive a stud 1301 on an arm 1300, hubbed to the before-mentioned arm 887. Therefore, when the arm 887 is rocked by the mechanism shown in Fig. 25, in the manner just described, the arm 822 is rocked to disable the key release shaft 39 as hereinbefore described.

*Control of governor latch mechanism by multiplier keys*

It will be remembered that each bank of multiplier keys is provided with a link 656 (Fig. 23), which is differentially positioned in accordance with the key depressed in its appropriate bank. At its right-hand end the link is pivoted to the lever 657, loose on the shaft 658. At its upper end the lever 657 carries a multiplier segment-gear 925, which meshes with a multiplier pinion 926, loosely mounted on a shaft 927, which is supported by the multiplier side frames.

There is one of the multiplier segment-gears 925 and one of the multiplier pinions 926 for each bank of multiplier keys. Each of the multiplier pinions 926 carries a long tooth (not shown in this application), which tooth cooperates with a beveled surface 929 of a segment 930 (Fig. 23), which segment constantly tends to rock in a counter-clockwise direction under the influence of a spring 936, but is prevented from doing so by the long tooth above mentioned.

During the first regular cycle of operation of the machine each segment gear 925 is differentially adjusted in accordance with the key depressed in its appropriate bank. The differential movement of the segment gear 925 will rotate its multiplier pinion 926 as many teeth as there are units in the value of the key depressed in its bank. That is, if the five key in the appropriate bank has been depressed, the corresponding multiplier pinion 926 will be rotated five teeth in a counter-clockwise direction. The disk carrying the long tooth is secured to the pinion, and therefore, will move with it. As soon as the long tooth passes away from in front of the beveled surface 929, of the segment 930, the segment will rock counter-clockwise about the shaft 658, under the influence of the spring 936, a yoke 940, later described, having been first removed from the notch 941.

Each control segment 930 has a notch 931 formed therein, with which an arm 932, fast on a shaft 933 co-operates. Therefore, when the segment 930 moves upwardly, the arm 932 and the shaft 933 will be rocked slightly in a clockwise direction. There are five of these shafts 933 located one above the other, and equally distant radially from the shaft 658. Co-operating with each of these shafts 933 is one of the control segments 930. In Fig. 23 the segment 930 appropriate to the units bank of multiplier keys is shown.

Fast on each of the shafts 933 and located in the same vertical plane, are a plurality of square ended arms 934 (Fig. 25). It is apparent that as these arms 934 are fast on the shaft 933, they will be rocked clockwise whenever the machine is operated with a multiplier key in the bank appropriate thereto is depressed.

It will be remembered that in the first part of the first regular cycle of operation, the segment 911 is moved downwardly. After the segment 911 has been set in its downward position the arm 934 appropriate to each of the banks in which a key has been depressed, will be rocked in a clockwise direction and move the squared ends thereof into the notches 935 formed in the segment 911. Then, when the driver 896 pulls on the link 910 to move the segment 911 upwardly, the segment will be held thereby causing the latch 892 to be disconnected from the driver 896 and the shafts 634 and 710 will remain disconnected from the drive shaft 82.

During the multiplying cycles of operation, the segment gears 925 (Fig. 23), lever 657 and link 656 are returned one step at a time, that is, one step on each multiplying cycle, to their normal positions, as shown in this figure. When the multiplier pinion 926 reaches its home position, the long tooth will come into engagement with the beveled surface 929 of the control segment 930, and rock said segment downwardly, thereby rocking the arm 932, the shaft 933, and arm 934 appropriate thereto, far enough to disconnect the arm 934 (Fig. 25) from the corresponding notch 935 in the segment 911. This movement of the pinions 926 continues successively, that is, first the units pinion is reset, and then the tens pinion is reset, etc. Finally, when the pinion 926 appropriate to the highest order bank in which a key has been depressed, is returned to zero, and the high tooth thereof rocks the arm 932, and through the shaft 933, rocks the arm 934 out of notch 935 in the segment 911, there is nothing left to stop the segment 911 when the driver 896 moves upwardly during the last multiplying cycle, and therefore, the differentially movable arm 891 and the latch 892 will be carried upwardly until the said latch is disconnected by the engagement of the shoulder 913 with the pin 914, as above described.

The control segments 930 are positively lowered during the second regular cycle and away from the teeth 928, in order to prevent the operation of arms 934 at any other times except during multiplying cycles. As has been pointed out, the multiplier banks of keys may also be used in connection with the adding keys 56 and 57, but when so used, the segments and everything connected therewith, must remain at rest.

Loosely mounted on the shaft 883 (Fig. 23) is the detent yoke 940, above referred to, which cooperates with the notches 941 formed in the segments 930. Both ends of the yoke 940 have a downwardly extending arm 942, each carrying a roller 943 adapted to co-operate with the periphery of a cam disk 944, fast on the lower control shaft 634. These cam disks are so timed, that during the first one-quarter rotation thereof, which they receive during the first regular cycle of operation of the machine, the yoke 940 is moved to its ineffective position.

On the second regular cycle of operation, the cams will rock the yoke 940 to the position shown in Fig. 23, which will lower and hold all the control-segments 930 in their normal lower positions.

Control and resetting of multiplier pinions

All of the mechanism for controlling the resetting of the multiplier pinions 926 is fully illustrated and described in the parent Patent No. 1,786,525, and therefore, only a portion of that mechanism has been shown herein, and it will be very briefly described. Reference may be had to the above mentioned parent case if a full description of this mechanism is desired. It is thought sufficient to state here that the multiplier pinions 926 are rotated step by step to their home positions by means of a ratchet and companion pinion not shown, and to accomplish such a result a coupling pinion 1140 (Fig. 23) is moved into mesh with multiplier pinion and companion pinion (not shown), so that when the companion pinion is driven through the ratchet, the multiplier pinion and its segment 925 will be restored to their normal positions one step at a time.

There is, of course, on coupling pinion 1140 for each of the multiplier pinions, each coupling pinion being supported on an arm 1141 pivoted on the shaft 883; these coupling pinions and arms being moved successively to connect the multiplier pinions 926 with their companion pinions for the purposes above mentioned.

The mechanism, whereby the engaging arms 1141 and coupling pinions 1140 are rocked successively and held in engaging positions as long as may be necessary to return their corresponding multiplying pinions to zero positions, comprises five segment engaging plates 1143, each of which has a slot 1144 provided with a cam portion 1145 at a certain point therein. There are five of these plates 1143, and the cam portion 1145 is in a different position in each one of the plates. The one shown in full lines in Fig. 23, is the one appropriate to the units bank. Each cam slot has projecting thereinto a roller 1146 on its associated pinion engaging arm 1141.

Considering the units engaging plate 1143, as this plate is rocked clockwise until the roller 1146 is in the opposite end of the slot, such roller will come into contact with the cam portion 1145 thereon and rock the arm 1141 counter-clockwise to move the coupling pinion 1140 into mesh with the multiplier pinion 926 and its companion pinion (not shown).

The engaging cam plates 1143 are controlled by differential mechanism which it is not thought necessary to show or describe in this application, and for a description thereof reference may be had to the parent case, Patent No. 1,786,525.

Multiplying totalizer

The special multiplying totalizer on which the product is accumulated on multiplying operations, is shown generally in Fig. 1, and will be but briefly described. For a more detailed description thereof reference may be had to the parent case, Patent No. 1,786,525.

Fig. 1 shows a totalizer pinion 961 that is on the left-hand end of the totalizer line. This pinion is supported on sleeve 962 carried by brackets, only one, 963, of which is shown supported by tubes 964 carried by their plates, only one of which, 965, is shown. The end plates being tied together by the tubes 964 form a shiftable carriage for the multiplying totalizer.

Decimal mechanism

In this machine the multiplicand is always pointed off with two decimals. These two decimal places are constant in all operations, and up to this point the description has contemplated only a multiplier composed of whole numbers. The machine is, however, designed to multiply correctly with a multiplier having as many as four decimal places, or any lesser number of such places.

When the multiplier is a whole number with no decimal places, the multiplying totalizer is moved to its extreme left-hand position when the product is transferred to the selected product totalizer at the end of a multiplying operation. It can be seen that in order to point off one decimal place, in addition to the two constant decimal places in the product, all that is necessary is to shift the multiplying totalizer one denominational order toward the right side frame before the product is transferred. If the multiplying totalizer is positioned two denominational orders to the right of its normal position, two decimal places will be pointed off in the product, in addition to the two constant decimal places.

Likewise, if there are three or four decimal places in the multiplier, the multiplying totalizer will be shifted three or four places toward the right before the product is transferred. In the last mentioned instance there will be a total of six decimal places which will be pointed off in the product. It is to be understood, however, that the product as printed will only show the two constant decimal places, as the decimals in excess of two are automatically dropped in a manner which will be hereinafter described.

There are four keys 68, previously mentioned herein (Fig. 23), which control the decimal mechanism. The keys 68 are carried by horizontally disposed key stems 1250, which are in turn slidably mounted in a cross frame 1251, extending between the multiplier side frames, only one of which 585 is shown. The decimal keys 68 are normally held in their outer positions by means of coil springs 1252, which surround the stems 1250.

At the rear end of each of the key stems 1250 is a laterally projecting pin 1253. Each of the pins 1253 is adapted to co-operate with a beveled arm 1254, pinned to the shaft 905. The beveled arms 1254 are formed, beginning with the key on the right for the first decimal place, with successively greater angles. It is evident, therefore, that each key 68, starting on the right and proceeding toward the left, will rock the shaft 905 a certain distance, this distance increasing successively toward the left. These keys are each located between the banks of multiplier keys, in order that the decimal point in the multiplier may be easily located when it is desired to multiply by a decimal.

For instance, if it were desired to multiply by 9.9 the right-hand one of the keys 68 would be depressed, as this key controls the first decimal place. If, however, it were desired to multiply by 9.99, the second key 68 from the right would be depressed, as this positions the decimal point in the second place. When the decimal keys are depressed they are held in their depressed positions by detents 1255, which are rocked first counter-clockwise about the shaft 905, due to the engagement of the pins 1253 with beveled portions of said detents, and then after the pins 1253 pass the beveled portions, they will rock clockwise under spring tension to move the detent shoulders in front of the pins, thus retaining the depressed keys in such positions.

The detents 1255 are loose on the shaft 905, and are connected together by a yoke 1256, which constantly tends to rock in a clockwise direction under influence of a spring 1257 stretched between the yoke and a hook secured to the rear frame of the machine. The action of this spring is to keep the detents 1255 constantly in contact with the pins 1253. After the pin 1253 has passed the bevel portion and shoulder of the detent, the spring will rock the said detent clockwise, to retain the key in depressed position. When one of the decimal keys is depressed, and another one is pressed, the first key will be released, as, when the second key is depressed the detent 1255, will be rocked and the first mentioned pin released from the shoulder of the detent appropriate thereto. The spring 1252 for this key, will then return it to its outer or undepressed position.

Means is provided for releasing the depressed decimal key during the last multiplying cycle of operation. Integral with one end of the yoke 1256 is release arm 1270 which carries a pin projecting through a slot 1271 formed in the upper end of a link 1272 pivoted to an arm 1273 fast on the release shaft 39. When the machine is released the shaft 39 is rocked clockwise without rocking the arm 1270, but will lower the link 1272 until the pin which cooperates therewith lies in the upper end of the slot 1271. The slot also permits depression of a decimal key without movement of the release shaft 39 and probably release of keys in the control and amount banks. During the last multiplying cycle the release shaft 39 is rocked counter-clockwise past its normal position to release the depressed amount keys. This movement will cause the lower end of the slot to come into contact with the pin on the release arms 1270 and rock the detents 1255 to release the operated decimal key.

Means is provided for locking the decimal differential shaft 905 in its adjusted position throughout the operation of the machine. This is accomplished in the following manner: Fast on the extreme right-hand end of the shaft 905 (Fig. 23), is a segmental locking arm 1312, which carries a plurality of teeth 1313. Loosely mounted on the shaft 783 is a bell crank aligning lever 1314. The downwardly extending arm of this lever carries an aligning tooth 1315, which is adapted to co-operate with the teeth 1313 on the arm 1312. The upper end of the bell crank lever 1314 carries a roller 1309, which projects into a cam groove 1310, cut in the side of a disk 1311, fast on the upper control shaft 710. This control shaft, it will be remembered, receives a one-quarter rotation on each of the regular cycles of operation of the machine, exclusive of multiplying cycles, and the cam groove 1310 is so formed that in the normal position of the disk 1311, the aligning tooth 1315 of the bell crank 1314 is disengaged from the teeth 1313, carried by the arm 1312. While in this position one of the decimal keys may be depressed.

When the cam disk 1311 receives its first one-quarter rotation the bell crank lever 1314 will be rocked clockwise far enough to engage the tooth 1315 with the aligning teeth 1313 on arm 1312, thereby locking the decimal mechanism carried on shaft 905 in its adjusted position until the extreme end of the operation of the machine. At this time the bell crank lever 1314 is rocked counter-clockwise to its normal position, thereby removing the tooth 1315 from the teeth 1313, and permitting the movement of the shaft 905.

Preferred forms of mechanism for use with the present machine

The mechanism which is to be hereinafter described, is considered to be the best embodiment of certain features of this invention. This preferred form includes changes in the mechanism previously described, which greatly simplify certain portions of the machine. The description of these improved forms cannot be made very connected, as improvements apply only to certain parts of the machine. They will, therefore, be taken up individually, and the changes in the mechanism which they are to supplant, will be noted. If a part is not changed in the improved form, the same reference numeral will be used.

Some of the main driving and supporting shafts retain their same relative positions, while others are omitted, or their positions changed. For instance, the upper control shaft 710 has been entirely omitted in the present construction and the parts driven therefrom receive their movement from other sources.

Means for driving and disabling the lower control shaft

In the improved form of mechanism now being described, the lower control shaft 634 accomplishes not only its previous functions, but also takes the place of the upper control shaft, which has been omitted. As the lower control shaft 634 in the improved form is the only control shaft, the designations upper and lower will be discontinued hereinafter.

Figure 36:
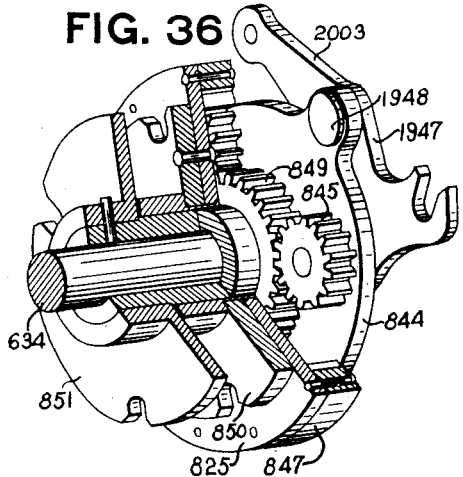
Figure 38:
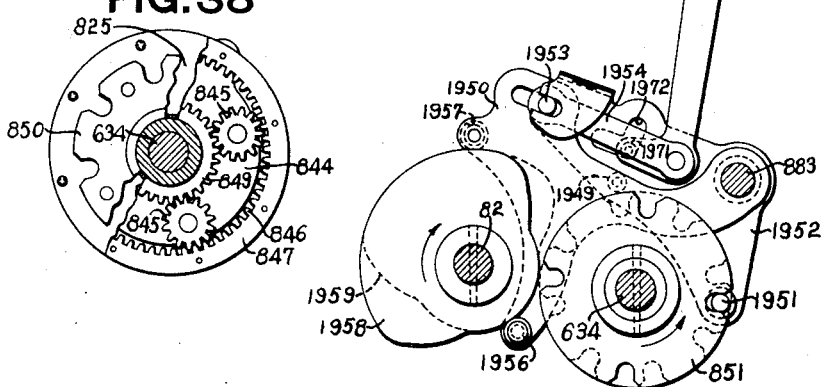

The control shaft 634 is driven by a pair of cams 1940 and 1941 (Fig. 42) fast on the main drive shaft 82. These cams co-operate with rollers 1942 and 1943 respectively, carried by a lever 1944, loosely mounted on the shaft 634. At its right-hand end the lever 1944 carries a pin 1945, which projects through a notch 1946 formed in a coupling lever 1947, pivoted at 1948 to the disk 844, previously described, and shown in Figs. 36, 38 and 42.

It is the disk 844 which carries the pinions 845, which mesh with the gear 849, fast on the sleeve, surrounding shaft 634, and pinned thereto, and also with the teeth 846 on the interior periphery of the ring 847 on the disk 825. The formation of cams 1940 and 1941 is such that during each cycle of operation of the shaft 82, the lever 1944 will be rocked first clockwise, and then counter-clockwise to normal position.

Upon the clockwise movement of the lever 1944, the disk 844 and the pinions 845 will be rocked in a clockwise direction, about shaft 634 and as during this operation the gear 849 is held against rotation, the pinions 845 will roll over the teeth of the gear 849 and drive the ring 847 in a clockwise direction. When, however, the movement of the lever 1944 is reversed and the disk 844 and pinion 845 are rocked counter-clockwise, the ring 847 is held against movement and the pinions 845, therefore, roll over the interior teeth of the ring and drive the gear 849 and shaft 634 in a counter-clockwise direction, as the shaft and gear are free to rotate at this time. This movement of the parts is sufficient to drive the shaft 634 one quarter of its complete rotation, as has been previously described.

Means for holding, first the gear 849 against rotation, and then releasing this gear and holding the ring 847 against rotation will now be described. Pinned to the side of the shell 847 is a disk 850, which has a plurality of notches cut in its periphery. The notches in the disk 850 are adapted to co-operate with a pin 1949 carried by a retaining lever 1952 (Figs. 37 and 39), pivoted on the shaft 883. Pinned to the sleeve which carries the gear 849 and which is in turn pinned to the shaft 634 is the disk 851. This disk has notches formed in its periphery, which co-operate with a pin 1951, also carried by the lever 1952, pivoted on the shaft 883. An operating lever 1950 is normally connected to the retaining lever 1952 by a pin 1953, carried by the left-hand end of a link 1954, which at its opposite end is pivoted to the lower end of a long lever 1955, shown in Fig. 37. The operating lever 1950 carries rollers 1956 and 1957, which co-operate with a pair of cams 1958 and 1959 fast on the shaft 82.

The cams receive one complete clockwise rotation during each rotation of the shaft 82, and they are so formed that the lever 1950 will be rocked first counter-clockwise and then clockwise to its normal position.

Figure 39:
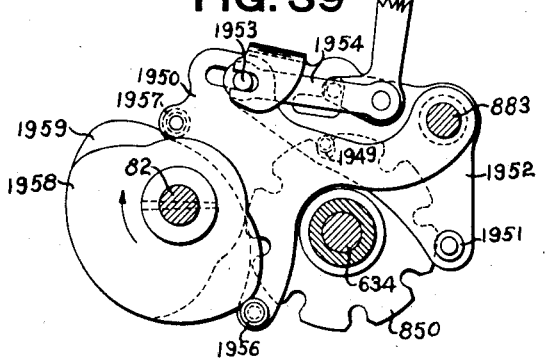

Fig. 39 shows the operation of the machine partly completed, and the lever 1950 in its moved position. As long as the pin 1953 connects the operating lever 1950 with the retaining lever 1952, the latter will be rocked counter-clockwise and clockwise with the lever 1950. When the counter-clockwise movement of these levers takes place, the pin 1951, will be removed from the notch in the disk 851, which will permit the gear 849 and shaft 634 to be rotated, and at the same time the pin 1949 will move into one of the notches in the disk 850, thereby holding the ring 847 against movement. When the parts are reversed and brought to the position shown in Fig. 37, the pin 1951 will be in engagement with the notch in the disk 851, thereby preventing the movement of the gear 849 and shaft 634, whereas the pin 1949 will be out of engagement with the disk 850, thereby permitting the rotation of the ring 847.

The control shaft 634 is never operated on adding operations, and therefore, means is provided to disable the control shaft driving mechanism on such operations. This means is as follows: Pin 1953 which connects the levers 1950 and 1952 is carried by the link 1954, pivoted to the lever 1955. It is evident that if the lever 1955 is rocked clockwise, the link 1954 will be moved to the left, and the pin 1953 will be disengaged from the notch in the lever 1952, which it normally occupies. Therefore, the rocking movement of the lever 1950 will have no effect upon the lever 1952. This will leave the pin 1951 in the notch in the disk 851, thereby locking the control shaft 634 against movement. The lever 1955 is rocked in a clockwise direction to disengage the retaining lever 1952 from the operating lever 1950 during adding operations in the following manner.

Figure 37:
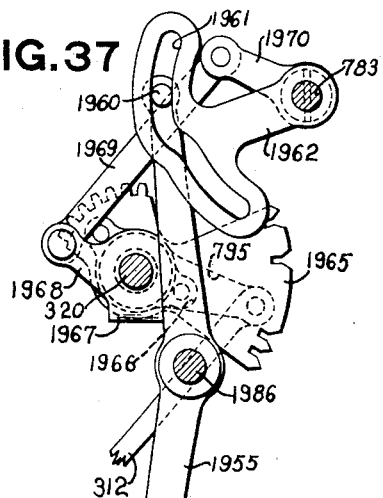

At its upper end the lever 1955 carries a pin 1960, which projects through a slot 1961 formed in an arm 1962 fast on the shaft 783 previously described. In Fig. 37 the arm 1962 is shown in the position which it occupies during multiplying operations. During adding operations the arm 1962 is rocked clockwise by mechanism which will be presently described, and the slot 1961 in the arm 1962 is so shaped that the lever 1955 will be rocked in a clockwise direction, thereby disengaging the parts as above described.

The shaft 783 and the arm 1962 are operated in the following manner. The differential mechanism for the release bank shown in Fig. 12, positions the link 312, differentially, in accordance with the key in this bank, which has been depressed. If the operation is to be a multiplying one, one of the keys 58 or 59 which occupy, respectively, the second and third positions in this bank, and which are the two lower keys in the release bank, will be depressed. The link 312 will, therefore, only be positioned a short distance. If, however, the operation is to effect adding, one of the keys 56 or 57 will be depressed, and this will cause the link 312 to be moved downwardly to a greater extent. The link 312 is pivoted at its upper end to an arm 795 (Fig. 12) loose on the shaft 320, previously described. The arm 795 is connected to the segmental plate 1965, also loose on the shaft 320.

Pinned to the segmental plate 1965 is an arm 1966 connected by a yoke 1967 to an arm 1968. Pivoted to this arm is the lower end of a link 1969, which at its upper end is pivotally connected to an arm 1970, fast on the shaft 783.

Thus it can be seen that when the differential latch for the release bank disconnects in either of its two lowermost positions, the arm 1962 will not move sufficiently to rock the lever 1955 (Fig. 37). When, however, an adding operation is to take place, the differential latch disconnects in one of the two upper positions, and this will cause the link 312 to be moved downwardly to a greater extent. The downward movement of the link 312 will rock the arm 795 and segmental plate 1965 in a clockwise direction, and through the yoke 1967 the arm 1968 will be rocked clockwise. This movement through the link 1969 will rock the arm 1970, shaft 783 and arm 1962 also in a clockwise direction a sufficient distance to cause the slot 1961 in the arm 1962 to rock the lever 1955 clockwise, thereby moving the pin 1953 out of engagement with the notch in the lever 1952.

The lower end of the lever 1955 carries a pin 1971, which co-operates with a slot 1972 formed in the retaining lever 1952. This slot is L-shaped, so that the lever 1952 may rock about the shaft 883 and also the lever 1955 can be rocked clockwise, thereby moving the pin into the left-hand end of the slot 1972. It is apparent from the above description that during adding operations the control shaft 634 will receive no movement whatever as it is locked by the pin 1951 which is held in position shown by the pin 1971 engaging the lateral portion of the slot 1972.

Governor differential mechanism

In multiplying operations the control shaft drive is disabled during the actual multiplying cycles, but is rendered effective during the four regular cycles of operation. This disabling of the control shaft driving mechanism is controlled by the governor differential mechanism. This mechanism is quite different from that previously described, and therefore, it will be necessary to describe the new mechanism.

The governor differential mechanism is driven by two cams 1980 and 1981 (Fig. 42), fast on the shaft 1982 supported by the side frames 585 and 586 of the multiplying device. These cams co-operate with rollers 1983 and 1984 respectively, carried by a lever 1985 loosely mounted on a shaft 1986, also supported by the multiplier side frames. Connected by means of a hub to the lever 1985 is an arm 1987 which is bifurcated, and co-operates with a roller 1988 carried by a driver 1989 loosely mounted on the shaft 658. The cams 1980 and 1981 are so formed that upon each cycle of operation of the machine, the lever 1985 will be rocked first counter-clockwise and then clockwise into its normal position.

When the driver 1989 is rocked clockwise, a pin 1990 carried thereby will come into contact with a differentially movable segment 1991, which is loose on the shaft 658, and rock this segment clockwise. The segment 1991 carries a latch pawl 1992, adapted to co-operate with a notch formed in the driver 1989. When the driver 1989 and the differentially movable segment 1991, have moved to their full extent in a clockwise direction, the driver will be rocked counter-clockwise by the cams 1980 and 1981, and on its counter-clockwise movement the differentially movable segment 1991 will be carried with it, due to the engagement of the latch pawl 1992 with the notch in said driver.

Pivoted to the latch pawl 1992 and to an arm 1994 is an arcuate bar 1993, which carries five laterally projecting pins 1995. These pins 1995 are adapted to co-operate with the five arms 934, carried by the shaft 933 in the same manner as previously described. These five shafts correspond to the five banks of multiplier keys, and if a key in any bank is depressed, the corresponding shaft 933 will be rocked slightly in a clockwise direction, far enough to bring the end of the arm 934 thereon into the path of its corresponding pin 1995. Then, upon the counter-clockwise movement of the driver 1989 and differentially movable segment 1991, the pin on the bar 1993 will strike the end of the arm 934, which has been set up, and therefore, the latch pawl 1992 will rock clockwise out of engagement with the notch in the driver, thereby stopping the differentially movable segment 1991 in its lower position in which the nose of the latch pawl will engage with the lower one of the notches cut in the stationary plate 1996, which is supported by the shafts 1169 and 883.

The driver 1989 will, of course, rock clockwise and counter-clockwise on every cycle of operation. However, as long as one of the arms 934 remains in the path of its corresponding pin 1995, the differential latch will be disconnected and the nose of the latch pawl will co-operate with the lower one of the notches in plate 1996. It has already been described how during the multiplying cycles of operation the arms 932 are rocked counter-clockwise to their normal position successively, as the various multiplying cycles are accomplished.

When, however, the multiplying cycles have been completed, the driver 1989 will carry the differentially movable segment 1991 with it to its normal upper position in which the latch will be disconnected in the upper position and the parts will be maintained in such positions throughout the three remaining regular cycles of operation.

The segment 1991 has an arm 1997, to which is pivoted one end of a beam 1998, which at its lower end is bifurcated and co-operates with a pin 1999, carried by an arm 2000, loose on the shaft 658. The arm 2000 is connected by a hub to an arm 2001, which at its lower end has a slot 2002 formed therein. This slot is concentric with the shaft 634 so that it will maintain the slot 1946 over the pin 1945 during the rocking movement of the lever 1944. Co-operating with this slot is a pin 2003, which is carried by the upper end of the lever 1947, previously described. When the differentially movable segment 1991 moves in its clockwise direction during the first regular cycle of a multiplying operation the upper end of the beam 1998 is positioned further to the right than is shown in Fig. 42, and when the latch 1992 is disconnected in the lower position, the upper end of the beam is held in its adjusted position. Then on the counter-clockwise rotation of the driver 1989, a downwardly extending arm 2004 which carries a roller 2005 operates to bring the roller into contact with the beam 1998, thereby adjusting the beam in accordance with the differential position of the segment 1991. This movement of the beam will move the pin 1999, rock the arm 2000 and the arm 2001 in a clockwise direction, moving the arm 2001 sufficiently to bring the pin 2003 into co-operative relation with the opposite end of the slot 2002.

This movement of the pin in the slot will rock the lever 1947 counter-clockwise a sufficient distance to disengage the notch 1946 therein from the pin 1945, carried by the lever 1944, and therefore the movement of this lever will have no effect on the control shaft, and this shaft will not be driven during the multiplying cycles of operation.

When the multiplying cycles have been finished, however, the differential mechanism will be moved to its upper position, and through the beam 1998 the arm 2001 will be rocked counter-clockwise to the position shown in Fig. 42, which will rock the lever 1947 clockwise and engage the notch 1946 with the pin 1945, so that during the last three regular cycles of operation of the machine, the control shaft 634 will receive a one-quarter rotation during each regular cycle.

During the time that the notch 1946 is out of engagement with the pin 1945, the lever 1947 is held against movement by the engagement of a notch 2007 cut therein, with a pin 2008, carried by an arm 2006, projecting downwardly from the shaft 883.

*Multiplier bank differential mechanism*

The preferred form of differential mechanism for the multiplier banks of keys is shown in Fig. 43. This mechanism is driven by a pair of cams 2010 and 2011 fast on the main drive shaft 82. These cams co-operate with rollers 2012 and 2013, carried by a segmental gear 2014 loosely mounted on the shaft 668 previously described.

The segmental gear 2014 has an upwardly extending arm 2015 which at its upper end carries a roller 2016, entered in an open slot 2017 of a driver 2018 fast on the shaft 620, which shaft also carries a driver 2018, appropriate to each of the five banks of multiplier keys, all to be driven from the pair of cams 2010 and 2011. The driver 2018 has a nose 2019 formed thereon, which normally engages with a notch 2020 formed in a latch pawl 2021 pivotally mounted on a differentially movable arm 2022, loose on the shaft 620. There is one of these differentially movable arms and latch pawls for each of the drivers 2018. The cams 2010 and 2011 rotate in a clockwise direction and are so formed that the segmental gear 2014 will be rocked first counter-clockwise and then clockwise to its normal position. On the counter-clockwise movement of the segmental gear 2014 the driver 2018 will be rocked clockwise about the shaft 620, thereby moving the differentially movable arm 2022 also in a clockwise direction. As the differentially movable arm 2022 moves clockwise, the tail 2023 of the latch pawl 2021 will come in contact with the inner end of whichever one of the keys has been depressed in its corresponding bank, and will be rocked counter-clockwise to disengage the differentially movable arm from the driver, which will continue with the clockwise movement.

The adjustment of the differentially movable arm 2022, in accordance with the key depressed, will position the upper end of a beam 2024 also differentially. Means is provided after the beam has been adjusted by the differentially movable arm, to position the other end thereof in order to complete the movement of the beam.

The means for adjusting the beam 2024 will now be described: The teeth 2025 of the segmental gear 2014 mesh with teeth 2026 formed on a segment 2027, fast on the shaft 660. Also fast on the shaft 660 appropriate to each of the multiplier banks of keys is beam-actuating arm 2028, which at its upper end carries a roller 2029. It can be seen from Fig. 43 that when the segmental gear 2014 is rocked counter-clockwise by the cams 2010 and 2011 to move the differentially movable arm 2022 upwardly, the teeth 2025 which co-operate with teeth 2026 will rock the segment 2027 and shaft 660 and all of the arms 2028 clockwise, and the rollers 2029 will come into engagement with the lower edge of the beams 2024, thereby adjusting these beams differentially, in accordance with the value of the keys depressed.

Figure 26:
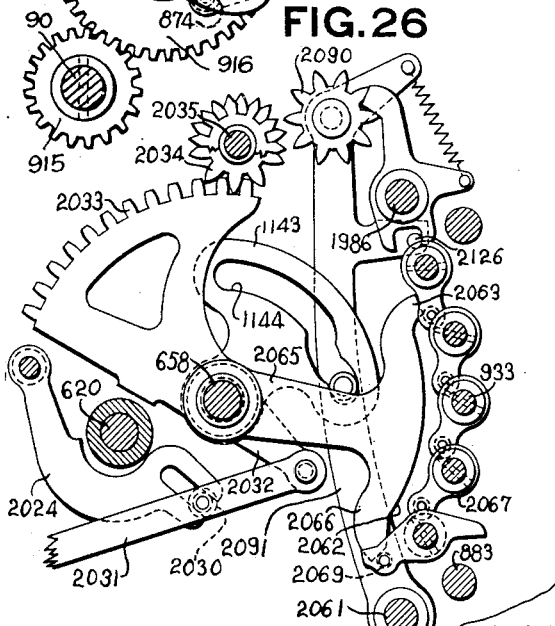
Fig. 26 shows another form of adjusting mechanism for the multiplier pinions.

At their right-hand end the beams 2024 are bifurcated, and co-operate with rollers 2030 (Fig. 26), carried by links 2031. Each of the links 2031 at its right-hand end is pivoted to an arm 2032 loose on the shaft 658. Each of the arms 2032 has formed integral therewith a segment gear 2033, which meshes with a corresponding multiplier pinion 2034, loose on a shaft 2035 supported by the side frames of the multiplying device. This mechanism is best shown in Fig. 26, and it can be seen from this figure that when the beam 2024 is adjusted differentially as above described, the differential movement will be imparted to the link 2031, and through this link to the arm 2032 and the segment gear 2033, which will be rocked in a clockwise direction a distance equivalent to the value of the key depressed, thereby rotating the appropriate one of the multiplier pinions 2034 as many teeth as there are units in the value of the key depressed.

The preferred form of mechanism for rocking the five shafts 933 during a multiplying operation will now be described. The mechanism is shown in Fig. 26, and is to take the place of the mechanism previously shown in Fig. 23. It has already been described how the segments 2033 are rocked clockwise differentially, under the control of the multiplier keys, by their appropriate differential mechanisms.

Integral with each of the segments 2033 is an arm 2065, which at its end carries a segmental detent 2066, adapted to co-operate with one of a plurality of arms 2067, fast on the shafts 933. There is one of these arms on each of the shafts 933, and each of these arms co-operates with its appropriate segmental detent 2066. In Fig. 26 the segmental detent which co-operates with the arm 2067 on the lowest one of the shafts 933 is shown. This arm 2067 is appropriate to the units bank of multiplier keys.

All of the shafts 933 are spring pressed in a clockwise direction by coil springs (not shown). The clockwise movement of the shafts 933 is, however, normally prevented by the engagement of the pins 2069, carried by the arms 2067, with the lower ends of their appropriate segmental detents 2066. It can be seen, however, from Fig. 26, that when the segment 2033 and the arm 2065, carrying segmental detent 2066 are rocked clockwise from 1 to 9 steps, under the control of the multiplier keys, the lower end of the segmental detent 2066 will be moved away from the path of the pin 2069, and as the segmental detent 2066 is recessed as at 2062 above its detaining surface, it is evident that the arm 2067 and its appropriate shaft 933 can be rocked in a clockwise direction under the influence of its spring.

If no key in the appropriate bank of multiplier keys has been depressed, and the differential mechanism thereof moves upwardly ten spaces before the latch is disconnected, the segment 2033 and the segmental detent 2066 attached thereto, will be rocked clockwise ten spaces. In this position the arm 2067 will be held in its position, as the segmental detent 2066 has a raised section 2063 in its tenth position as well as in its first position, so that the shaft 933 appropriate to this bank of keys will be held in its normal position before the beginning of the multiplying cycles, and it will, therefore, have no effect on the result of the multiplication.

It will be recalled that the various functions of the multiplying mechanism are controlled by the positions of the arms 934 and shafts 933, and it can be seen from the above description how the positioning of the arms in either their effective or ineffective positions is accomplished in the preferred form of mechanism.

The multiplier coupling pinions 2090 (Fig. 26) are moved into mesh with the multiplier pinions 2034 and their companion pinions in a manner similar to that previously described and it is not thought necessary to go into any further description of that mechanism here.

Manual key release mechanism

Figure 41:
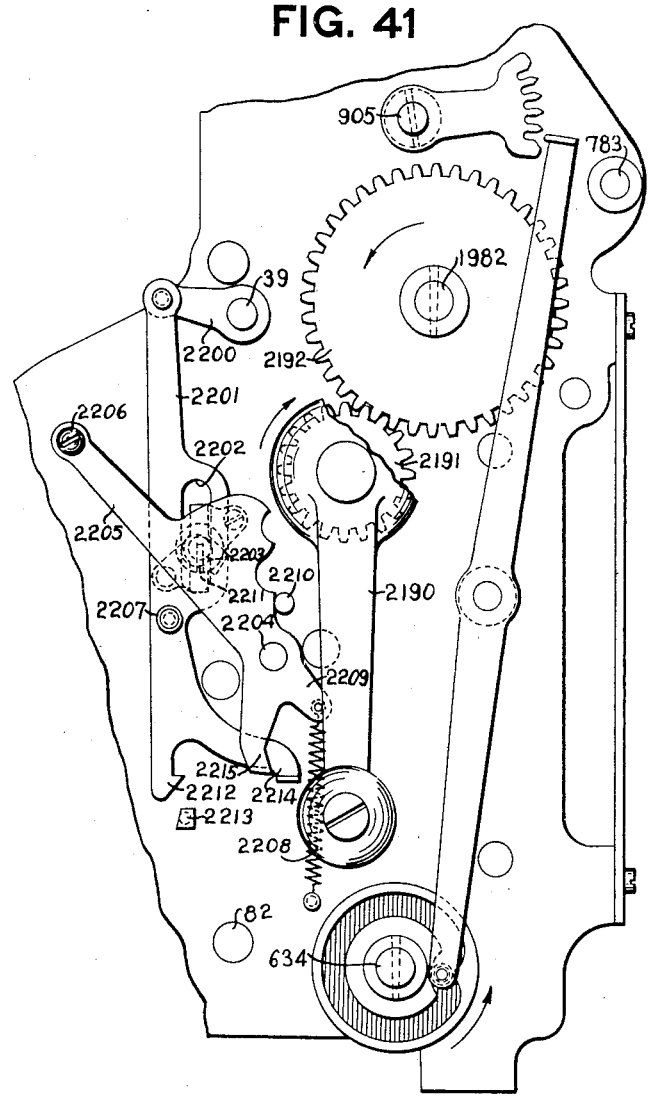

The preferred form of mechanism for releasing any of the depressed keys, previous to the release of the machine is shown in Fig. 41, and is constructed in the following manner:

Fast on the release shaft 39 is an arm 2200, to which is pivoted the upper end of a release slide 2201 having a slot 2202 formed therein, surrounding a key barrel 2203, supported by the side frame of the machine. Pivoted on a stud 2204 is a manually operable key-release lever 2205, which at its upper end has a handle 2206 formed thereon, in order to facilitate the movement of the lever. When it is desired to release one of the depressed keys, the handle of the lever 2206 is grasped by the operator and the lever 2205 is rocked counter-clockwise about its pivot to bring the edge of the lever into contact with a roller 2207 carried by the release slide 2201 and move the slide downwardly, whereupon the arm 2200 will rock the release shaft 39 counter-clockwise a sufficient distance to release the depressed keys, in the manner previously described.

A spring 2208 is attached to an arm 2209 of the lever 2205, and tends to return the lever 2205 to its normal position. A pin 2210 is carried by the machine side frame in such a position that it will form a stop for the lever 2205 when it reaches its normal position. Means is provided for locking the machine against operation, by means of an insertable key, should the operator expect to be absent for any time. This device is also shown in Fig. 41.

Should the operator desire to lock the machine the manual key release lever 2205 is rocked counter-clockwise to its greatest extent, at which time a key hole in a key barrel 2203, previously mentioned, will be exposed. The operator will then insert a key in the key barrel and rotate the lock in a counter-clockwise direction. On the key barrel 2203 is an eccentric 2211, which co-operates with the slot 2202, previously mentioned, and when the lock is turned by the key, the eccentric will rock the release slide 2201 counter-clockwise about its pivot, which will bring a hook 2212 thereof beneath a lug 2213 carried by the side frame 586.

The release slide 2201 will, therefore, be held in its lowest position and the arm 2200 and shaft 39 will be held in their rocked positions, so that it is impossible to release the machine for operation. Such positions of the parts will, of course, be maintained until the key is once more inserted and the eccentric 2211 returned to normal, whereupon the release slide 2201 can move upwardly, and permit the arm 2200 and shaft 39 to rock clockwise to their normal positions.

The manual key release is provided with the usual interlock, to prevent release of the machine when the key-release lever 2205 is out of its normal position. The release slide 2201 which is pivoted to the arm 2200 fast on the shaft 39 has a rearwardly extending projection 2214 having a lip 2216 bent at right angles thereto and adapted to co-operate with a downwardly extending finger 2215, of the lever 2205. It can be seen from Fig. 142 that as soon as the lever 2205 starts to move counter-clockwise to release the keys, the finger 2215 will come above the lip 2216 of the projection 2214, and thereby prevent any upward movement of the release slide 2201, thus preventing the release of the machine. It is also evident that when the machine is released, the release slide 2201 will move upwardly, which will bring the lip 2216 of the projection 2214 behind the downwardly extending finger 2215 of lever 2205, thereby preventing the rocking of the lever 2205 to release the keys while the machine is being operated.

Figure 40:
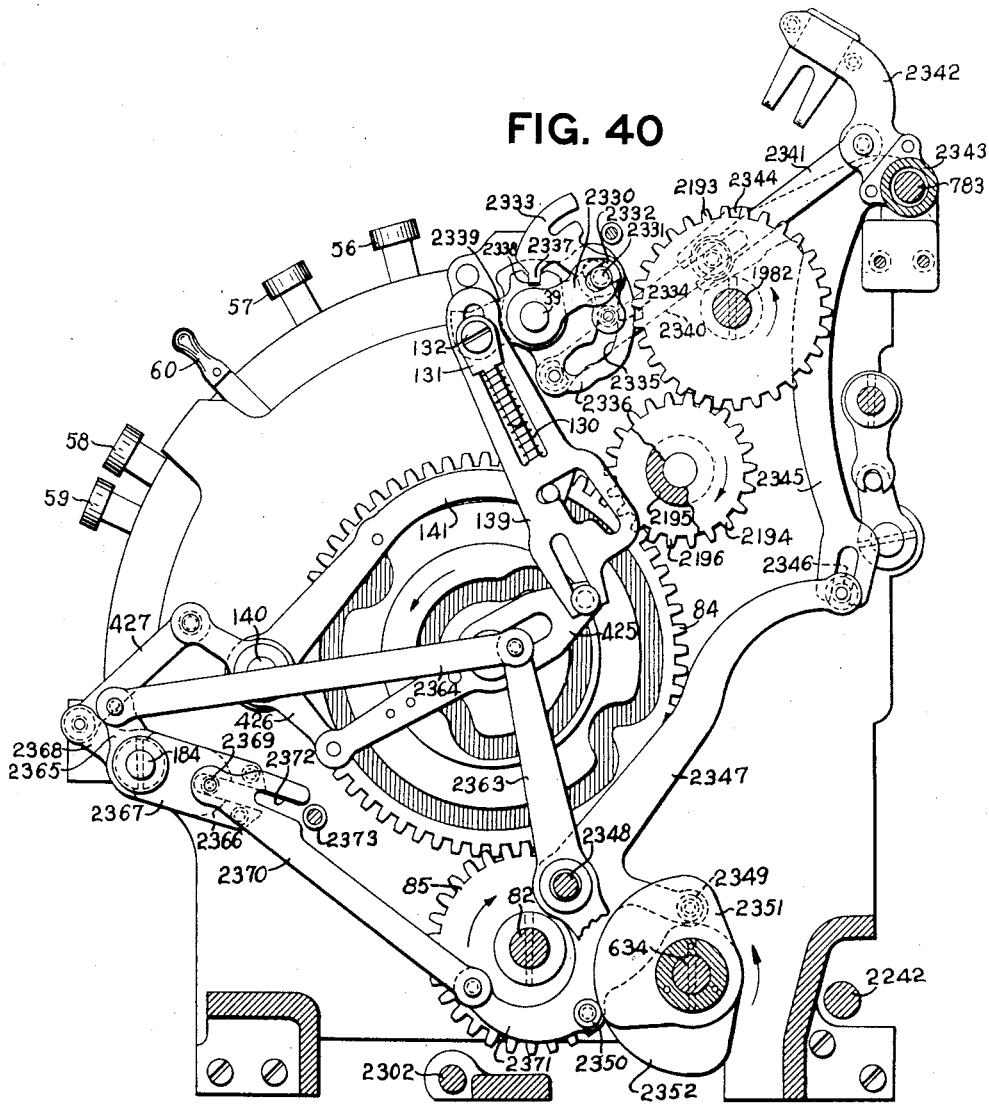

Mechanism for preventing restoration of the release mechanism during the multiplying cycles of operation When the machine is released by the depression of one of the keys in the release bank, the shaft 39 is rocked in a clockwise direction (Fig. 40). At the end of the operation the shaft is rocked counter-clockwise slightly past its normal position, and then clockwise to its normal position by mechanism which is very old and well known in machines of this type.

On multiplying operations it will be recalled, the machine is given a variable number of cycles of operation, and it is therefore not desired to rock the shaft 39 in its counter-clockwise direction excepting on the last multiplying cycle and the last regular cycle of operation, and means is therefore, provided for disconnecting the shaft 39 from its usual rocking mechanism during the preceding and intervening cycles. The shaft 39 carries an arm 2330 fast thereto and bifurcated at its right-hand end to straddle a pin 2331 carried by an arm 2332, loose on the shaft 39. Pivoted on the pin 2331 is a lever coupler 2333, which at its lower end carries a pin 2334 projecting through a cam slot 2335 formed in a cam plate 2336, also loose on the shaft 39. At its upper end the lever coupler 2333 carries a square lug 2337, which engages with a notch 2338, cut in a projection of an arm 2339, loose on the shaft 39. The arm 2339 at its left-hand end is connected by a pin 132 with the upper end of the restoring link 139, previously described.

On an adding operation, when there is to be only one cycle of operation the shaft 39 is rocked in a clockwise direction by the spring 130, which acts to rotate the arm 2339 in a clockwise direction. As the lug 2337 of the lever coupler 2333 engages the notch in the arm 2339 it is evident that the lever coupler 2333 will be rocked clockwise about the shaft 39. As this lever coupler is carried by the arm 2332, and the pivot pin 2331 of the coupler extends through the bifurcated portion of the arm 2330, the shaft 39 will be rocked also in a clockwise direction. At the end of the operation the link 139 is moved downwardly by the restoring lever 141 in a well known manner, and this through the above mentioned connection, will rotate the shaft 39 counter-clockwise to its normal position.

On multiplying operations, however, it is desired to prevent the counter-clockwise rotation of the shaft 39 at the end of the first cycle of operation, and therefore, the following mechanism is provided for accomplishing this purpose. Pivoted to the cam plate 2336 is a link 2340, which at its upper end is pivoted to a similar link 2341, pivoted at its upper end to an arm 2342 fast to a sleeve 2343 surrounding the shaft 783. The opposite end of the sleeve 2343 carries the arm 2180 to which is pivoted the upper end of the link 2176 (Fig. 42) adjusted by the governor differential mechanism. If the operation is a multiplying one, the link 2176 is moved upwardly during the first cycle of operation. This will cause the sleeve 2343 to be rocked clockwise, and through the arm 2342 and links 2341 and 2340 the cam plate 2336 will be rocked counter-clockwise about the shaft 39, and the cam groove 2335 rocks the lever coupler 2333 in a clockwise direction about the pin 2331, thereby disconnecting the lug 2337 on the coupler from the notch 2338 in arm 2339.

The arm 2339 can then be rocked at will by the link 139 and its associated mechanism, but the movements of these parts will have no effect upon the shaft 39, which will remain in its released position until the last multiplying cycle of operation. During the last multiplying cycle, the governor differential restores the link 2176 which re-engages the coupler 2333 with the arm 2339 so that the shaft 39 may be rocked to release the multiplicand keys.

Following the multiplying cycles of operation, however, there are three more cycles which the machine must perform to complete the multiplying operation, and as at the end of the multiplying cycles, that is, on the last multiplying cycle, the link 2176 is lowered and the sleeve 2343 and arm 2342 are rocked counter-clockwise to their normal positions, it is evident that some other mechanism must be provided to prevent the restoration of the shaft 39 to its normal position on the next operation, i. e., the second regular cycle. In order to accomplish this function there is provided an arm 2344, which is bifurcated and co-operates with the pivot pin that joins the two links 2340 and 2341. The arm 2344 is formed integrally with an arm 2345 loosely mounted on the shaft 783. At its lower end the arm 2345 is bifurcated to embrace a pin 2346, carried by the upper end of a lever 2347, loose on a stud 2348, projecting from the machine frame.

The lever 2347 carries rollers 2349 and 2350, adapted to co-operate with a pair of cams 2351 and 2352 respectively, fast on the control shaft 634. These cams will receive a one-quarter movement in a counter-clockwise direction during each regular cycle of the machine. It can be seen from Fig. 40 that during the first one-quarter rotation of the cam, the lever 2347 will not be moved. This occurs during the first regular cycle of operation.

Next in sequence comes the multiplying operations, and then comes the second regular cycle of operation, and on this operation the cams 2351—2352 are designed to rock the lever 2347 counter-clockwise about the stud 2348, thereby, through the pin 2346, rocking the arm 2345 and arm 2344 clockwise about the shaft 783. As the upper end of arm 2342 is held stationary at this time this movement of the arms 2344 will cause the toggle formed by the links 2340 and 2341 to be broken thereby rocking the cam plate 2336 counter-clockwise a sufficient distance to enable the cam slot 2335 thereof to actuate the lever coupler 2333 to disconnect the shaft 39 from its restoring mechanism.

This action will prevent the restoration of the release shaft during the second regular cycle of operation and the cams 2351 and 2352 will also prevent this restoration during the third regular cycle. On the fourth cycle, however, it is desired to have the shaft 39 restored, and therefore, the cams 2351 and 2352 will cause the arm 2344 to be rocked counter-clockwise to straighten the toggle formed by links 2340 and 2341, which movement will rock the cam plate 2336 clockwise and reengage the lug 2337 of lever coupler 2333 with the notch 2338 in arm 2339.

On the next downward movement of the link 139 by the restoring arm 141, it can be seen that the shaft 39 will be rocked slightly past its normal position, and then back to its normal position, as it is connected to its restoring mechanism.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:

1. In an accounting machine, the combination of two banks of control keys, a bank of release keys certain of which are normally locked against depression, means operable by any of the keys in one of said control banks for releasing said release keys, and means operable by certain of the keys only, in the other of said control banks for releasing said release keys.

2. In a machine of the class described, the combination of a release shaft, a pawl normally preventing release movement of said shaft, release keys for moving said pawl to permit release movement of said shaft, and means movable into position under control of said keys during the operation of the machine for preventing return movement of said pawl into functioning position during a predetermined number of cycles of operation.

3. In a machine of the class described, the combination of a release shaft, a pawl normally preventing release movement of said shaft, means for moving said pawl to permit release movement of said shaft, an actuator movable differentially under control of said means, and means operable depending upon the extent of differential movement of said actuator, for preventing return movement of said pawl into functioning position during a predetermined number of cycles of operation.

4. In a machine of the class described, the combination of a release shaft, a pawl normally preventing release movement of said shaft, release keys for moving said pawl to permit release movement of said shaft, means under control of said keys for preventing return movement of said pawl into functioning position during a certain number of cycles of operation, a second set of keys, and means under control of said second set of keys controlling the number of cycles during which said preventing means remains effective.

5. In an accounting machine, a shaft movable in one direction to release the machine, two sets of keys, means operated by the release shaft as it moves to release the machine for locking both sets of keys, means for returning said shaft to home position thereby normally releasing both sets of keys, and means for preventing release of one set of keys when said shaft is moved to its home position.

6. In an accounting machine, two sets of keys, a shaft for releasiong both sets of keys, means for controlling the machine to operate the release shaft twice to the same extent to release one set of keys during each operation of the release shaft and means for preventing the release of one set of keys during the first movement of said shaft.

7. In an accounting machine, two sets of keys, a shaft for releasing depressed keys in both sets, means for operating said shaft twice to the same extent to release one set of said keys during each operation of the shaft, and means for controlling the effectiveness of said shaft as to one set of keys during one of its operations.

8. In an accounting machine, two sets of keys, a shaft for releasing depressed keys in both sets, means for operating said shaft twice to the same extent to release one set of said keys during each operation of the shaft, means for controlling the effectiveness of said shaft as to one set of keys during one of its operations, and a key controlled differentially movable actuator for determining the operation of said controlling means.

9. In an accounting machine, two sets of keys, a key release shaft movable to release both sets of keys, and means under control of one of said sets of keys for preventing the release of one set of keys by such movement of said shaft during certain operations of the machine.

10. In an accounting machine, two sets of keys, a release shaft movable to release both sets of keys, actuators controlled by each set of keys, and means controlled by the actuators of one set of keys for controlling the effectiveness of the release shaft as to one set of keys.

11. In an accounting machine, two sets of keys, actuators therefor, a key release shaft movable twice to the same extent to release both sets of keys, and means controlled by the actuator for one set of keys for preventing the release of said one set by the first movement of said shaft.

12. In an accounting machine, two sets of keys, an actuator controlled by one of said sets of keys, a key release shaft operable once or twice during operations of the machine, and means controlled by said actuator for determining the number of operations of said shaft during an operation of the machine.

13. In an accounting machine capable of operations of a plurality of continuous cycles, the combination of a plurality of banks of depressible keys, a detent for each bank for holding the depressed keys in their depressed positions, means for moving all of said detents to release the depressed keys at a certain point in said operation, and means for preventing the movement of the detents in certain banks until the end of the operation.

14. In an accounting machine capable of operations of a plurality of continuous cycles, the combination of a plurality of banks of depressible keys, a detent for each bank for holding the depressed keys in their depressed positions, means for moving all of said detents to release the depressed keys at a certain point in said operation, and a cam actuated pitman for preventing the movement of the detents in certain banks until the end of the operation of the machine.

15. In an accounting machine, a plurality of sets of keys, a shaft movable in one direction to release the machine and in the opposite direction to release said sets of keys, a pawl normally preventing movement of said shaft to release the machine and operable by one set of keys, a second pawl adapted to prevent a repeat-machine-release movement of said shaft, and means for holding both of said pawls in ineffective positions to permit machine-release movement thereof.

16. In an accounting machine, a plurality of sets of keys, a shaft movable in one direction to release the machine and in the opposite direction to release said sets of keys, a pawl normally preventing movement of said shaft to release the machine and operable by one set of keys, a second pawl adapted to prevent a repeat-machine-release movement of said shaft, and means for holding both of said pawls in ineffective positions to permit machine-release movement of the shaft, and key-release movement thereof without interception, for a subsequent machine release movement.

17. In an accounting machine, a shaft movable in one direction to release the machine, a pawl normally preventing release movement of said shaft, a second pawl preventing repeat-release movement of said shaft, and a slidable bar for holding both pawls in a position in which they cannot interfere with the release movement of the shaft.

18. In an accounting machine, a shaft movable in one direction to release the machine, a pawl normally preventing release movement of said shaft, a second pawl preventing repeat-release movement of said shaft, a common pivot for said pawls, a slidable bar, and shoulders on said bar for holding both pawls in a position in which they cannot interfere with the release movement of the shaft.

19. In an accounting machine, a plurality of sets of keys, a shaft movable in one direction for releasing the machine and in the opposite direction for releasing the keys, a pawl normally preventing machine release movement of said shaft, a pawl for preventing repeat-machine-release movement of said shaft, and means cooperating with one pawl to prevent release of one of said sets of keys upon key-release movement of said shaft, and with both pawls for permitting a second machine-release movement of said shaft.

20. In an accounting machine, the combination of a plurality of totalizers, a plurality of banks of keys, a pivoted member normally obstructing depression of certain keys in one of said banks, a second pivoted member adapted to be rocked by any one of certain of the keys of another of said banks, means rigidly connecting said pivoted members together to permit depression of said first mentioned keys after depression of any one of said second mentioned keys, means for controlling the machine to enter items and to take totals, and a connection between said controlling means and said obstructing member for rocking said member into ineffective position upon adjustment of said controlling means to control the machine for a total-taking operation.

21. In an accounting machine, the combination of a plurality of totalizers, a plurality of banks of keys, a pivoted member normally obstructing depression of certain keys in one of said banks, a second pivoted member adapted to be rocked by any one of certain of the keys of another of said banks, means rigidly connecting said pivoted members together to permit depression of said first mentioned keys after depression of any one of said second mentioned keys, a total lever for controlling the machine to take totals, and a loose connection between said total lever and one of said pivoted members to cause said members to be moved upon movement of the total lever and to permit the said member to move independently of the total lever upon depression of one of said first mentioned keys.

22. In an accounting machine, a plurality of banks of control keys, a bank of normally depressible release keys including a multiplying key and an add and total-taking key, total control means, interlocking means requiring depression of a key in one of said control banks to permit depression of a key in the other of said control banks, means movable to lock out said multiplying key, and connections between the total control means and said interlocking means and lockout means for moving said interlocking means to permit depression of any key in either control bank and for moving said lockout means to lock out said multiplying key upon adjusting said total control means to control the machine for a total-taking operation.

23. In an accounting machine, the combination of quantity and product totalizers, normally free quantity totalizer selecting keys, normally locked-out product totalizer selecting keys, normally free item entering and multiplying release keys, a total control lever, means operated by a quantity key for releasing the product keys, and means operated by movement of the total lever into a total-taking position to lock out the multiplying release keys.

24. In an accounting machine, a bank of release keys comprising an item entering key and a multiplying key, a total lever, and means pivoted coaxially with the total lever and operated by the total lever as it is moved into a total-taking position, for locking out the multiplying key.

25. In an accounting machine, the combination of quantity and product totalizers, normally free quantity totalizer selecting keys, normally locked-out product totalizer selecting keys, normally free item entering and multiplying release keys, a total control lever, means operated by a quantity key for releasing the product keys, means operated by movement of the total lever into a total-taking position to lock out the multiplying keys, and means for releasing said product keys upon movement of said total lever into said total-taking position.

26. In an accounting machine adapted to multiply by performing a fixed number of cycles of operation and a varying number of additional cycles of operations, the combination of a shaft adapted by its movement in one direction to release the machine, means for rocking this shaft, restoring means therefor, and means for preventing the restoration of said shaft during all but the last of the fixed and additional cycles.

27. In an accounting machine adapted to perform operations of a plurality of cycles, the combination of a shaft to release the machine for operation, means adapted to rock said shaft to releasing position and return, means for normally connecting said rocking means to said shaft, and means for disconnecting said rocking mechanism from said shaft when the shaft is in its releasing position to prevent return of the shaft to its non-releasing position during certain of said cycles of operation.

28. In an accounting machine adapted to perform operations including a fixed number and a variable number of cycles, the combination of a release shaft, means adapted to rock said release shaft to releasing position at the beginning of the operation, means for rocking said shaft to normal once at the end of said variable cycles and again at the end of said fixed cycles.

29. In an accounting machine adapted to perform operations including a number and a variable number of cycles of operation, the combination of a release shaft, means adapted to rock said release shaft, means for normally connecting said rocking means to said shaft, and means for disconnecting said rocking means during certain of said fixed and variable cycles of operation.

30. In an accounting machine adapted to perform operations including a fixed number and a variable number of cycles of operation, the combination of a release shaft, means adapted to rock said release shaft to its releasing position and to return it to normal position, and means for disconnecting said rocking means from said shaft after said shaft has been moved to releasing position.

31. In an accounting machine adapted to perform operations including a fixed number and a variable number of cycles of operation, the combination of a release shaft, means adapted to rock said release shaft to its releasing position and return to normal position, means for disconnecting said rocking means from said shaft after said shaft has been moved to releasing position, and means for reengaging said rocking means during the last variable cycle of operation.

32. In an accounting machine adapted to perform operations including a fixed number and a variable number of cycles of operation, the combination of a release shaft, means adapted to rock said release shaft to its releasing position and return to normal position, means for disconnecting said rocking means from said shaft after said shaft has been moved to releasing position, means for reengaging said rocking means during the last variable cycle of operation, and means for again disengaging said rocking means on the next succeeding cycle.

33. In an accounting machine adapted to perform operations including a fixed number and a variable number of cycles of operation, the combination of a release shaft, means adapted to rock said release shaft to its releasing position and return to normal position, means for disconnecting said rocking means from said shaft after said shaft has been moved to releasing position, means for reengaging said rocking means during the last variable cycle of operation, means for again disengaging said rocking means on the next succeeding cycle, and means for again reengaging said rocking means during last fixed cycle of operation.

34. In an accounting machine, the combination of a release shaft, an arm fast on said shaft, a member pivoted on said arm and carrying pin, an arm loose on said shaft and having a bifurcated portion in which said pin normally rests, means for rocking said loosely mounted arm first one direction and then the other to rock said shaft, and means for rocking said member to remove the said pin from the bifurcated portion of said second mentioned arm in order to disconnect said shaft from said rocking mechanism.

35. In an accounting machine, the combination of a release shaft, an arm fast on said shaft, a member pivoted on said arm and carrying a pin, an arm loose on said shaft and having a bifurcated portion in which said pin normally rests, means for rocking said loosely mounted arm first one direction and then the other to rock said shaft, and a plate having a cam slot therein for rocking said member to remove the said pin from the bifurcated portion of said second mentioned arm in order to disconnect said shaft from said rocking mechanism.

36. In an accounting machine, the combination of a release shaft, an arm fast on said shaft, a member pivoted on said arm and carrying a pin, an arm loose on said shaft and having a bifurcated portion in which said pin normally rests, means for rocking said loosely mounted arm first one direction and then the other to rock said shaft, a plate having a cam slot therein for rocking said member to remove the said pin from the bifurcated portion of said second mentioned arm in order to disconnect said shaft from said rocking mechanism, and a plurality of means for rocking said plate.

37. In an accounting machine, a key release means, means for operating said key release means, a connection between the first two means, means for breaking the connection between said operating means and said key release means, two means for actuating said breaking means, a key for controlling the machine to perform multiplication, and means operated under control of said key for operating said actuating means at different times.

38. In an accounting machine capable of operating continuously through a control cycle, multiplying cycles, and three control cycles, multiplicand keys, a multiplying control key, multiplying keys, key release means, operating means therefor operable during each cycle of operation, means under control of the multiplying control key to break the connection between the key release means and its operating means during the first control cycle and to make the connection during the last multiplying cycle, and other means for breaking said connection during the second and third control cycles and again restoring it during the last control cycle.

39. In an accounting machine adapted to be controlled to perform control cycles and multiplying cycles, keys for controlling the number of multiplying cycles, key release means, operating means therefor, and means under control of said keys for breaking the connection between the key release means and its operating means during the first control cycle and for restoring said connection during the last multiplying cycle.

40. In an accounting machine, a multiplying control key, multiplier keys, release means for all of said keys, means under control of the control key for determining the time of release of the control key, and means under control of the multiplier keys when the control key is set, for controlling the time of release of the multiplier keys.

41. In an accounting machine adapted to operate through a control cycle, multiplying cycles, and a plurality of control cycles, multiplier keys and keys for setting up amounts to be multiplied, differentially settable elements actuated under control of the multiplier keys for determining the number of multiplying cycles, release means for said keys, operating means therefor, and means operated by any one of said settable elements for disconnecting said release means from its operating means in the first control cycle and connecting them in the last multiplying cycle.

42. In an accounting machine capable of performing processes of multiplication by a control cycle, multiplying cycles, and a plurality of subsequent control cycles, keys for setting up the multiplier and multiplicand, a key for controlling the machine for multiplying operations, means for releasing said setting up keys, operating means for the releasing means, and means controlled by the multiplying control key for disconnecting said operating means from said key release means during the second control cycle and again connecting them during the last control cycle.

43. In an accounting machine capable of performing the process of multiplication by a control cycle, multiplying cycles, and a plurality of subsequent control cycles, keys for setting up amounts involved in the process, a key for controlling the machine to perform the process of multiplication, release means for all of said keys, operating means therefor, means under control of certain of said keys for controlling the release of the amount keys, and means under control of the controlling key for releasing the controlling key.

44. In an accounting machine, a plurality of manipulative devices for controlling said machine, means to maintain the manipulative devices in controlling positions, means for releasing said devices prior to a complete operation of said machine, and means for automatically stopping the operation of the machine before the operation is complete should said devices fail to release.

45. In an accounting machine, a plurality of depressible keys for controlling said machine, means to latch the keys in their depressed positions, means for releasing the depressed keys prior to a complete operation of said machine, means for automatically stopping the operation of the machine before the operation is complete should said keys fail to release, and manually operable means for controlling said stopping means to permit the machine to complete its operation.

46. In an accounting machine, a plurality of depressible keys for controlling said machine, means to latch the keys in their depressed positions, means for releasing the depressed keys prior to a complete operation of said machine, means for automatically stopping the operation of the machine before the operation is complete should said keys fail to release, and manually operable means for releasing said depressed keys thereby permitting the operation of the machine to continue.

47. In an accounting machine adapted to perform a plurality of cycles for each operation of the machine, a plurality of depressible keys for controlling said machine, means to latch the keys in their depressed positions, means for releasing said keys near the end of one of the plurality of cycles of operation, and means for preventing a subsequent cycle of operation if the keys fail to release.

48. In an accounting machine adapted to perform a plurality of cycles for each operation of the machine, a plurality of depressible keys for controlling said machine, means to latch the keys in their depressed positions, means for releasing said keys near the end of one of the plurality of cycles of operation, means for preventing a subsequent cycle of operation if the keys fail to release, and means for releasing said keys thereby permitting a subsequent cycle of operation.

49. In an accounting machine adapted to perform a plurality of cycles for each operation of the machine, means for releasing said machine and for stopping it at the end of a cycle of operation and normally holding it in home position, depressible keys, means to latch the keys in their depressed positions, means for releasing said keys near the end of a certain cycle of operation, and means for preventing a release operation of said releasing means for a subsequent cycle of operation should said keys fail to be released by said key releasing means.

50. In an accounting machine, the combination of a plurality of depressible keys, means to latch the keys in their depressed positions, a shaft having a release position, an operating position and a normal position, means for rocking said release shaft from its operating position to its release position through its normal position and return to release the depressed keys at a particular point in said operation, and means for stopping said release shaft in its normal position during its return movement if any of said keys have failed to release.

51. In an accounting machine, the combination of a plurality of depressible keys, means to latch the keys in their depressed positions, a shaft having a release position, an operating position and a normal position, means for rocking said release shaft from its operating position to its release position through its normal position and return to release the depressed keys at a particular point in said operation, and a flexible pawl for stopping said release shaft in its normal position during its return movement if any of said keys have failed to release.

52. In an accounting machine, the combination of a plurality of depressible keys, means to latch the keys in their depressed positions, a shaft having a release position, an operating position and a normal position, means for rocking said release shaft from its operating position to its release position through its normal position and for returning it to release the depressed keys at a particular point in said operation, a member fast on said release shaft, and a flexible pawl adapted to be moved into the path of said member and so constructed that the member can be moved in one direction but not in the opposite direction if any of the keys have failed to release.

53. In an accounting machine, a bank of depressible keys, a detent actuated thereby and held out of its home position whenever a key is partially or fully depressed, releasing means for the machine operable to move said detent to release said keys at the end of a cycle of operation of the machine, and means controlled by said detent when held out of its home position after it is moved to release said keys for preventing a release of said machine by said releasing means.

54. In an accounting machine, a bank of depressible keys, a detent actuated thereby and held out of its home position whenever a key is partially or fully depressed, releasing means for the machine operable to move said detent to release said keys at the end of a cycle of operation of the machine, means adapted to be moved into cooperative relation with said releasing means to prevent a subsequent release of the machine should said keys fail to release, and a connection between said detent and said preventing means for causing said preventing means to move out of cooperative relation with said releasing means upon release of said keys.

55. In an accounting machine, a bank of depressible keys, a key locking detent operated thereby, a release shaft movable in one direction to release the machine and in the opposite direction to move the detent to release said keys, an obstruction movable into position to prevent a subsequent releasing movement of said shaft, and a connection between said obstruction and said detent to hold said obstruction in effective position when said detent is out of home position.

56. In an accounting machine, a multiplying key for controlling the machine to multiply, a plurality of depressible keys for setting up a number, means to latch the keys in their depressed positions, means for releasing said number keys, and means controlled by said multiplying key for stopping the machine at a certain point in its operation should any of said number keys then remain depressed.

57. In an accounting machine, a multiplying key for controlling the machine to multiply, a plurality of depressible number keys, means to latch the keys in their depressed positions, means for releasing the number keys at a certain point in the operation of the machine, and means operable by the machine under control of said multiplying key for stopping the machine should said number keys fail to release.

58. In a machine of the class described, the combination of amount keys, means for releasing said amount keys near the end of an adding operation, means for controlling the machine to automatically institute and perform a total taking operation at the end of the adding operation, and means controlled by the last named means for stopping the machine at the end of the adding operation when the amount keys fail to release.

59. In an accounting machine, a shaft movable in one direction to release the machine, two sets of keys, means operated by the release shaft as it moves to release the machine for locking both sets of keys, means for returning said shaft to home position thereby normally releasing both sets of keys, and automatic means for preventing release of one set of keys when said shaft is moved to its home position.

60. In a machine of the class described, the combination of amount keys and special keys; a machine release shaft normally locked but urged in a direction to release the machine; means controlled by the special keys to rock the shaft to release the machine; means to restore the shaft near the end of a cycle of operation of the machine; means to release the amount and special keys as the shaft is restored; and means to disconnect the first mentioned means from the shaft to prevent release of the special keys, thereby causing the machine to make an immediate subsequent operation, after the amount keys have been released.

61. In a machine of the class described, the combination with amount keys; control keys; and a release shaft normally urged in a direction to release the machine for operation, and adapted to release the depressed keys on its return to normal position; of a control shaft; driving means operable by depression of certain of the control keys to drive the control shaft, causing the machine to operate through a plurality of cycles; and means operable by the control shaft to rock certain sections of the release shaft to cause the amount keys to release during one cycle and the control keys to release during another cycle of operation.

In testimony whereof I affix my signature.
MAXIMILIAN M. GOLDBERG.

CERTIFICATE OF CORRECTION.

Patent No. 1,874,097. August 30, 1932.

MAXIMILIAN M. GOLDBERG.

It is hereby certified that error appears in the printed specification of the above numbered patent requiring correction as follows: Page 31, line 73, claim 6, after "shaft" insert a "comma"; page 33, line 55, claim 29, before "number" insert the word "fixed"; and line 114, claim 34, before "pin" insert the article "a"; and that the said Letters Patent should be read with these corrections therein that the same may conform to the record of the case in the Patent Office.

Signed and sealed this 13th day of December, A. D. 1932.

(Seal)

M. J. Moore,
Acting Commissioner of Patents.